United States Patent [19]

Leavitt et al.

[11] Patent Number: 4,471,449

[45] Date of Patent: Sep. 11, 1984

[54] SCAN CONVERTER SYSTEM

[75] Inventors: Steven C. Leavitt, Hampstead, N.H.; Hugh G. Larsen, West Newbury, Mass.; Barry F. Hunt, Nashua, N.H.

[73] Assignee: Hewlett-Packard Company, Palo Alto, Calif.

[21] Appl. No.: 317,081

[22] Filed: Nov. 2, 1981

Related U.S. Application Data

[63] Continuation-in-part of Ser. No. 203,746, Nov. 3, 1980, abandoned.

[51] Int. Cl.³ .................. G06F 15/20; H04N 5/02
[52] U.S. Cl. ........................... 364/577; 364/514; 358/140; 358/112; 73/620
[58] Field of Search ............... 364/414, 514, 516, 518, 364/417, 577, 415, 515, 169; 358/112, 140, 166; 128/660; 73/606, 618, 624, 620, 626

[56] References Cited

U.S. PATENT DOCUMENTS

| | | | |
|---|---|---|---|
| 4,002,827 | 1/1977 | Nevin et al. | 358/140 X |
| 4,058,001 | 11/1977 | Waxman | 73/620 |
| 4,074,281 | 2/1978 | Quarton | 364/723 X |
| 4,101,961 | 7/1978 | Fletcher et al. | 364/417 |
| 4,115,806 | 9/1978 | Morton | 364/515 X |
| 4,127,034 | 11/1978 | Lederman et al. | 364/415 X |
| 4,140,022 | 2/1979 | Maslak | 364/415 X |
| 4,155,259 | 5/1979 | Engeler | 364/415 X |
| 4,164,213 | 8/1979 | Hoelzler | 364/415 X |
| 4,187,857 | 2/1980 | Sato | 364/417 X |
| 4,206,653 | 6/1980 | LeMay | 364/415 X |
| 4,212,072 | 7/1980 | Huelsman | 358/112 X |
| 4,225,931 | 9/1980 | Schwefel | 364/557 |
| 4,231,097 | 10/1980 | Shibayama et al. | 364/557 |

FOREIGN PATENT DOCUMENTS

| | | |
|---|---|---|
| 1208310 | 10/1970 | United Kingdom . |
| 1413045 | 11/1975 | United Kingdom . |
| 1444819 | 8/1976 | United Kingdom . |

*Primary Examiner*—Edward J. Wise
*Attorney, Agent, or Firm*—Donald N. Timbie

[57] ABSTRACT

Apparatus for interpolating data along radial lines so that it can be displayed at display points arranged in orthogonal rows and columns by recursively adding stored values to derive signals indicative of the radial position of each display point along the radial data lines and its angular position between the radial data lines. Interpolation is done along each radial line to derive first and second intermediate interpolated values, and these values are interpolated so as to derive the final data value for the display point at its angular position. Alternatively, the intermediate interpolated values can be attained by angular interpolation and the final data value by radial interpolation.

24 Claims, 35 Drawing Figures

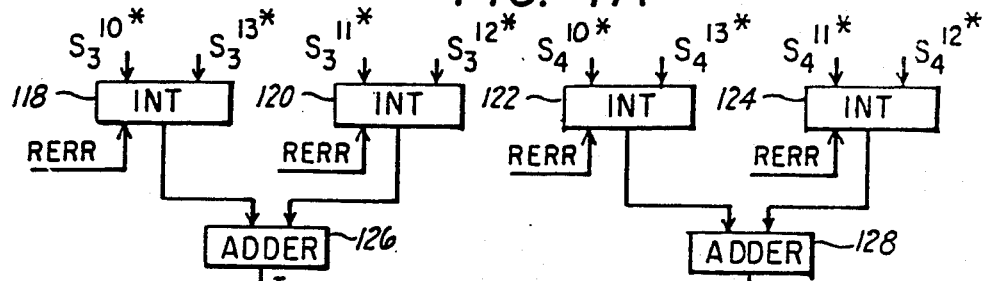
FIG. 4A
FIG. 5A
|  | BIT # | L# | DATA |  |
|---|---|---|---|---|
| L# OR DATA | 0(MSB) | 1 | 0 | 1=L#; 0=DATA |
| SIGN | 1 |  |  | 1=LEFT QUAD, 0=RIGHT QUAD |
|  | 2 |  |  |  |
|  | 3 |  |  |  |
|  | 4 |  |  |  |
|  | 5 |  |  |  |
|  | 6 |  |  |  |
|  | 7 |  |  |  |
|  | 8 |  |  |  |
|  | 9 |  |  |  |
|  | 10 |  |  |  |
| STROBE | 11(LSB) |  |  | IF 1 INFORMATION VALID |
FIG. 6A
| OUTER LINE MULTIPLEXER |||||||
|---|---|---|---|---|---|---|
| SIGN | M1 | M2 | M3 | MSB | LSB | OUTER LINE |
| 0 | 1 | 0 | 0 | 1 | 0 | M3 |
| 0 | 0 | 1 | 0 | 1 | 0 | M1 |
| 0 | 0 | 0 | 1 | 0 | 1 | M2 |
| 1 | 1 | 0 | 0 | 0 | 1 | M2 |
| 1 | 0 | 1 | 0 | 1 | 0 | M3 |
| 1 | 0 | 0 | 1 | 0 | 0 | M1 |
FIG. 6B
| INNER LINE MULTIPLEXER |||||||
|---|---|---|---|---|---|---|
| SIGN | M1 | M2 | M3 | MSB | LSB | INNER LINE |
| 0 | 1 | 0 | 0 | 0 | 1 | M2 |
| 0 | 0 | 1 | 0 | 1 | 0 | M3 |
| 0 | 0 | 0 | 1 | 0 | 0 | M1 |
| 1 | 1 | 0 | 0 | 1 | 0 | M3 |
| 1 | 1 | 1 | 0 | 0 | 0 | M1 |
| 1 | 0 | 0 | 1 | 0 | 1 | M2 |
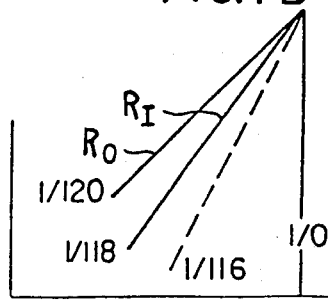
FIG. 7B
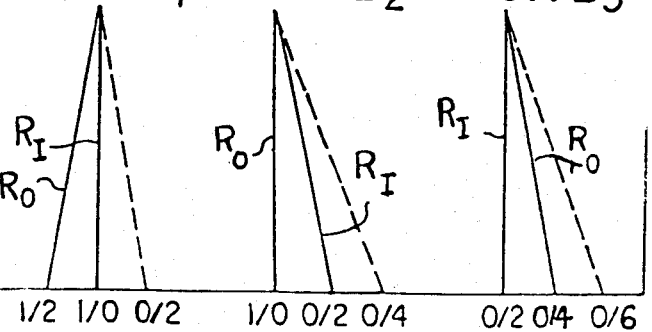
FIG. 7B₁   FIG. 7B₂   FIG. 7B₃

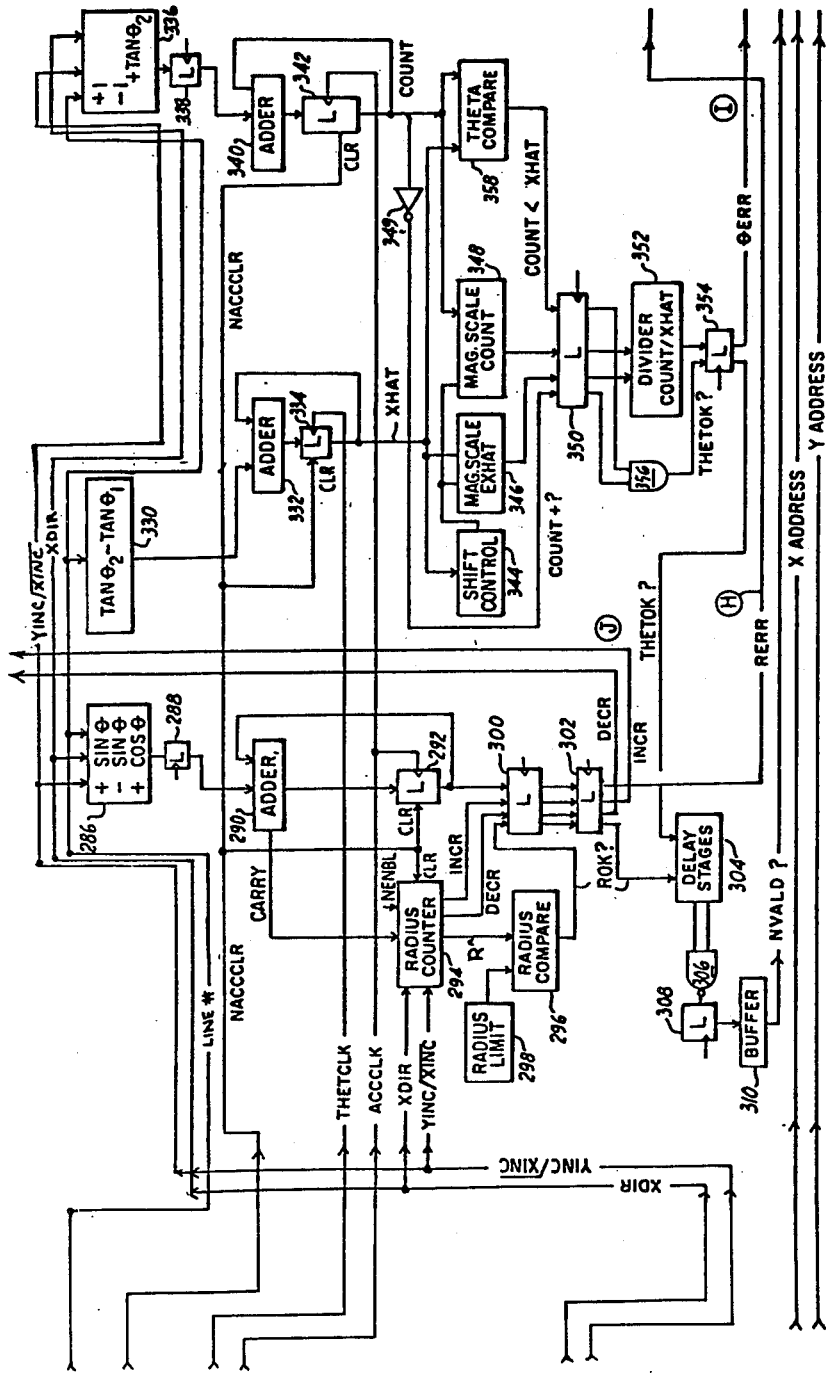

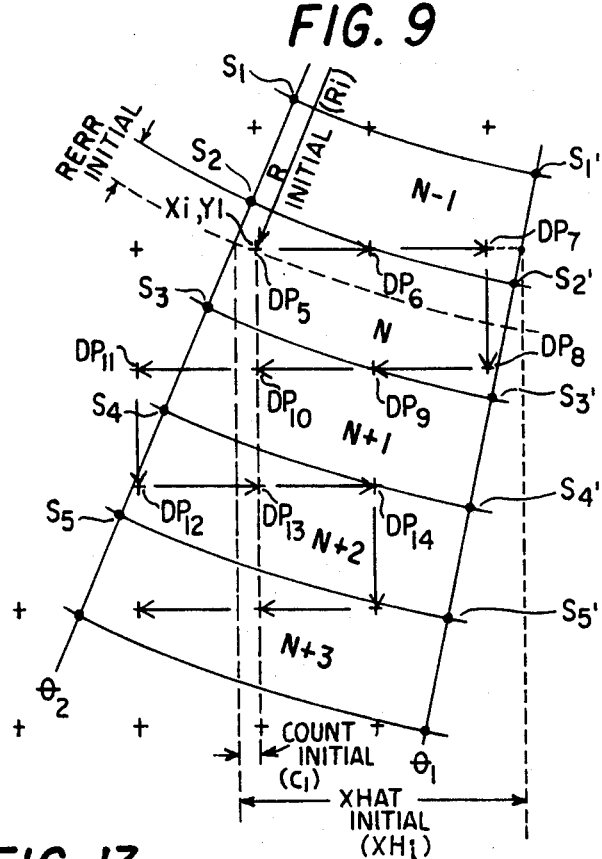
FIG. 9
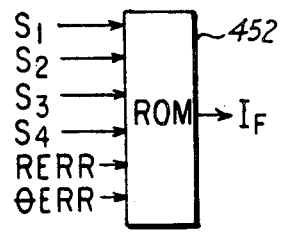
FIG. 14
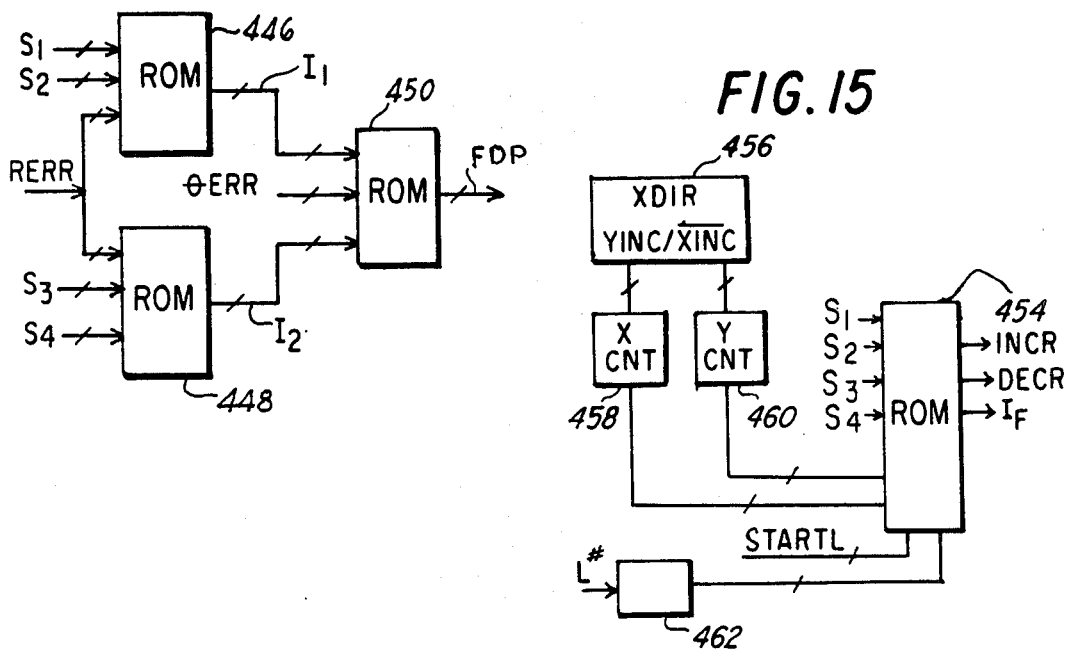
FIG. 13
FIG. 15

SCAN CONVERTER SYSTEM

BACKGROUND OF THE INVENTION

This application is a continuation-in-part of U.S. patent application Ser. No. 203,746 entitled "Scan Converter System" and filed on Nov. 3, 1980, now abandoned.

In instruments such as ultrasound scanners that are used to produce images of a cross-section of the heart and other organs of a patient, the data signals represent analog information along radial lines of a sector. Reproduction of the images in the same format is objectionable because of the voids between the radial lines. As a consequence of this, the modern approach is to sample the data along radial rays and write the sampled data into a digital display memory, sometimes referred to as a digital scan converter. A description of this approach may be found in the article by J. Ophir and N. F. Maklad, entitled "Digital Scan Converters in Diagnostic Ultrasound Imaging", Proc. IEEE, Vol. 67, No. 4, April 1979. Samples of the analog data along each radial line are obtained at points having a uniform spacing of such dimension as to satisfy the Nyquist criteria. Their x,y coordinates are determined from their R,$\theta$ coordinates and the samples are transferred to the nearest display point in a display memory. By resorting to this point-to-point translation rather than true image reconstruction, a number of problems occur, but the one of greatest significance is the moiré patterns that result from the fact that some display points in the display memory receive no information.

The moiré pattern can be eliminated by fill-in techniques, such as translating to an empty display point data from the sample written into the display point on either side, but artifactual boundaries or discontinuities are introduced into the image that are highly objectionable.

Another attempt to deal with the moiré problem has been to insert one or more radial lines of interpolated data between the actual radial lines of data prior to translating the information to the display points of a display memory as previously described. Whereas the moiré is reduced, the fact that many display points receive more than one sample and the fact that the last sample received is the only one that is reproduced in the image cause discontinuities that often manifest themselves in artificial "contrastiness" and radial tearing of the image. Attempted solutions to this problem have included peak detection or averaging of the samples written into a given display point. Although this does some good, it does not solve the problem. Furthermore, the read-modify-write operations involved require complex circuitry that in the present state of the art may not function with sufficient speed to permit real-time operation at desired sector scanning rate of thirty a second.

Brief Description of the Invention

Instead of translating data samples from points in the sector to selected points in the display memory, this invention provides means for selecting samples located at points on different radial lines that define a sub-slice, and deriving from those selected samples an interpolated data value for each display point contained in the sub-slice so as to form a true reconstruction of the image throughout the area. Generally but not necessarily, the samples selected are located at the intersections of two radial arcs with two radial lines so that the area preferred to has inner and outer radial boundaries and angular boundaries. First and second intermediate interpolated data values are derived at the radial position of each display point from the pair of samples respectively along each radial line or at the angular position of each display point from the pairs of samples respectively along each radial arc. If these first and second intermediate data values are derived at the radial position of a display point, a final interpolated data value is derived from them at the angular position of the display point; and if the first and second intermediate data values are derived at the angular position of a display point, a final interpolated data value is derived from them at the radial position of the display point. The radial position of a display point is its radial location with respect to the radial arcs that are on either side of it, and its angular position is its angular location with respect to the radial lines that are on either side of it. As will be explained, more than a pair of data samples can be used to derive the first and second intermediate interpolated data values. The interpolation in either or both the radial or the angular direction may be performed with an arbitrary choice of interpolation function; that is, we have chosen a "straight-line" function but, for example, a "cosine" function such as a Hanning cosine window could be used.

When the areas of an image are reconstructed in this manner, the problems of moiré and other artifacts previously referred to simply disappear, provided every display point in the sector is addressed.

As there are about 125,000 display points in a sector, it is apparent that the determination of their radial and angular positions and the interpolations referred to cannot be performed in the thirtieth of a second during which the sector is being scanned by straightforward calculations based on the x,y coordinates of the display points and the R,$\theta$ positions of the data samples.

Therefore, an important part of this invention is the provision of means whereby all these calculations can be done in real time.

Basically, this is accomplished by dividing the sector into slices that respectively lie between successive radial lines and providing display point scanning control signals that represent a step-by-step scanning along the rows and columns of display points in each slice in succession.

The radial position of each display point within a sub-slice is determined by recursive addition to or subtraction from the known radius of a previously scanned display point a stored value for each step along a row of display points and a different stored value for each step along a column of display points. After normalization, the fractional part of the recursive addition is the radial weighting desired and is called RERR.

The angular position of each display point within a sub-slice is determined by recursive addition to a known distance called COUNT of a previously scanned display point from one of the radial lines of a slice as measured along a row of display points in which the display point is located of a stored value for each step along a row of display points and a different stored value for each step along a column of display points so as to derive the signal or value COUNT for each display point. Another recursive addition is made to the known distance between the radial lines of a slice along a given row of display points of a given stored value for each step along a column of display points so as to derive a signal or value XHAT for each display point. The signals COUNT for each display point may be divided by the signal XHAT for that point so as to derive a signal or value θERR representing the angular position. Minimal error is involved with respect to the true angular position expressed as a ratio of arc lengths between a display point and the radial lines of the slice if the angle between the radial lines is small.

The saving in time for these calculations results from the small time required for each recursive addition as opposed to the time that would otherwise be required for a straightforward calculation of radius and angle. See the RERR and θERR calculations below.

Where the data samples represent brightness, as in an ultrasound system, only five bits are required to represent the thirty-two possible brightness levels that can be reproduced on a cathode ray tube. Thus, only five bits are required to represent the final values of RERR, COUNT, XHAT and θERR. In making the recursive addition, however, a larger number of bits, such as twelve, are used in order to reduce the amount of accumulated error to a tolerable level.

The interpolations can be effected in a very short time by multiplying with ROMs, and ROMs of a reasonable size can be used because both the brightness samples and the values of RERR and θERR that are used in the interpolations have only five bits.

Basis of Recursive Calculations and the Stored Values Used

For ease of notation, the center radial line is defined as 0 degrees. All angles are referenced to this and considered positive, i.e., the +45° radial line lies along both sides of a 90° sector. Also, when referring to a slice, the "outer" radial line $R_O$ has the larger angle labeled $\theta_2$ and the "inner" radial line $R_I$ has the smaller angle labeled $\theta_1$.

RERR

The error weightings RERR and θERR, which are required at each display point, ostensibly require the explicit calculation of the radius R and the angle θ, where θ is the angle between a vertical line through the center of the sector and a line through the display point to the apex of the sector slice. That is, for the $j^{th}$ display point $$R_j = \sqrt{x_j^2 + y_j^2}$$

where $(x_j, y_j)$ are the rectangular coordinates of the $j^{th}$ display point, and $$\theta_j = \tan^{-1} \frac{x_j}{y_j} \tag{2}$$

However, it can be shown that equation (1) may be alternatively computed from a recursive approximation resulting from a Taylor series approximation given by $$R_{j+1} = R_j - K_x \sin\theta_2 + K_y \cos\theta_2 \tag{3}$$

where $\theta_2$ represents the angle of the outer ray of the two radial rays making up the sector slice.

The recursive relationship adjusts the previous radius value by an incremental amount determined by the direction traversed between the previous point (j) and the new point (j+1). If the movement is in the x direction, left or right, then $K_y = 0$. Conversely, if the movement is in the y direction, up or down, then $K_x = 0$. If the movement in x is towards the center line of the sector, then $K_x$ is positive, resulting in an incremental decrease by $K_x \sin\theta_2$ of the radius. Conversely, for an outward movement in x, $K_x$ is negative, resulting in an incremental increase by $K_x \sin\theta_2$. If the movement in y is away from the sector apex, then $K_y$ is positive; and if the movement in y is towards the apex, $K_y$ is negative.

θERR

It will be shown that the stored value ΔXHAT that is added for each step of the scanned paths along a column of display points to derive XHAT for each display point is $\tan\theta_2 - \tan\theta_1$ where $\theta_2$ is the angle between the ray $\theta = 0°$ and the outer radial line of a slice, and $\theta_1$ is the angle between the ray $\theta = 0°$ and the inner radial line of a slice. Thus, $$XHAT_{j+1} = XHAT_j + \Delta XHAT K_y \tag{4}$$

It will also be shown that $$COUNT_{j+1} = COUNT_j + K_x + K_y \tan\theta_2 \tag{5}$$

the value of $\tan\theta_2$ being stored for each slice.

Figure 4:
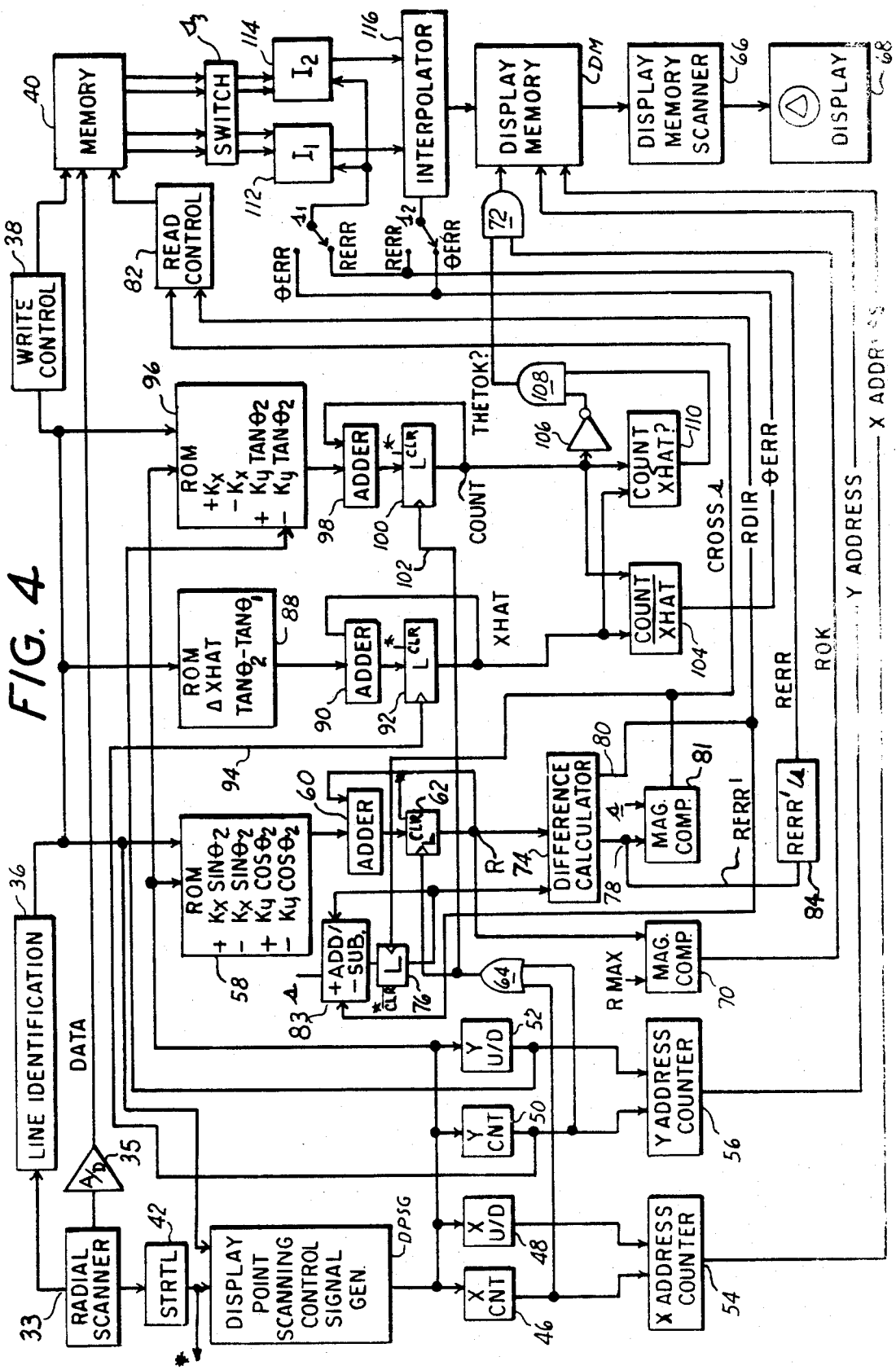
FIG. 4 is a general block diagram of a scan conversion system incorporating the invention.
Figure 5:
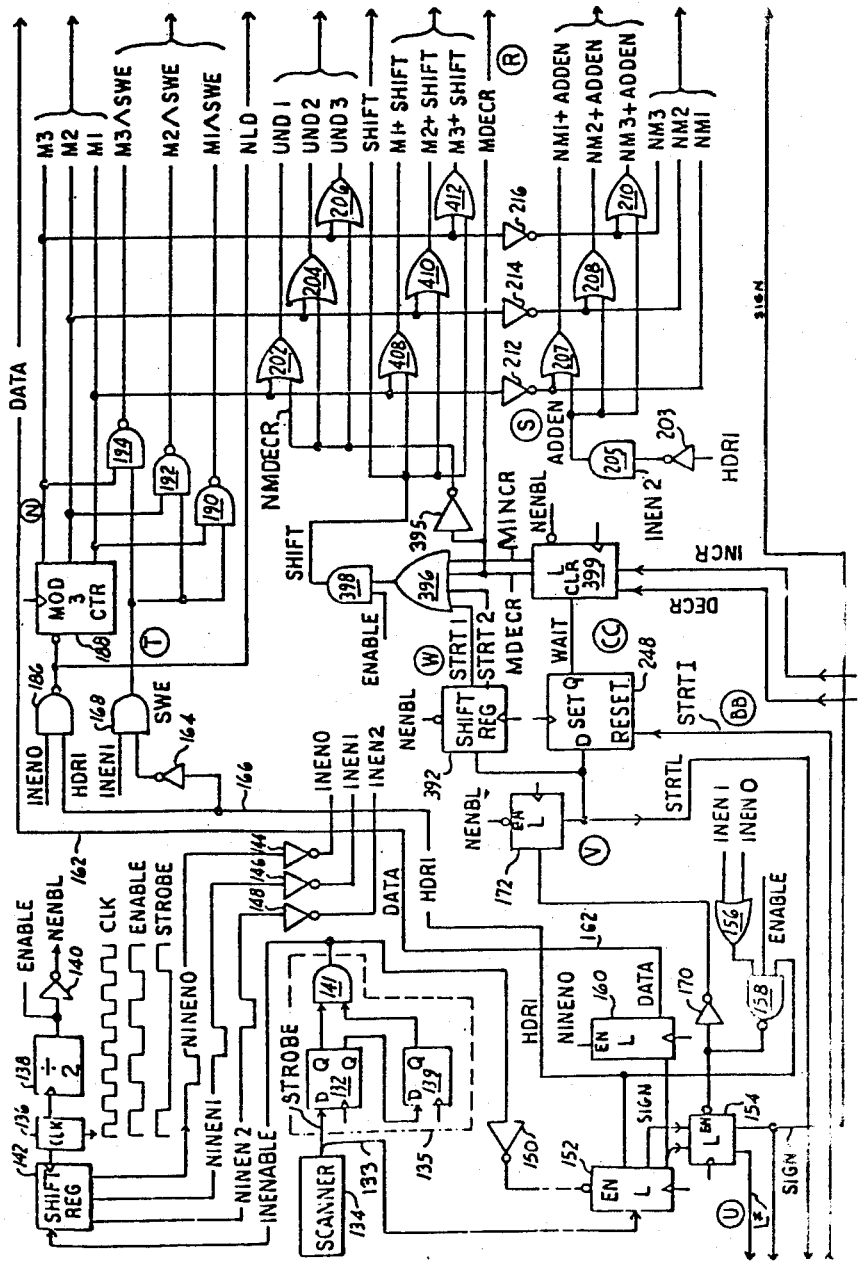
Figure 6:
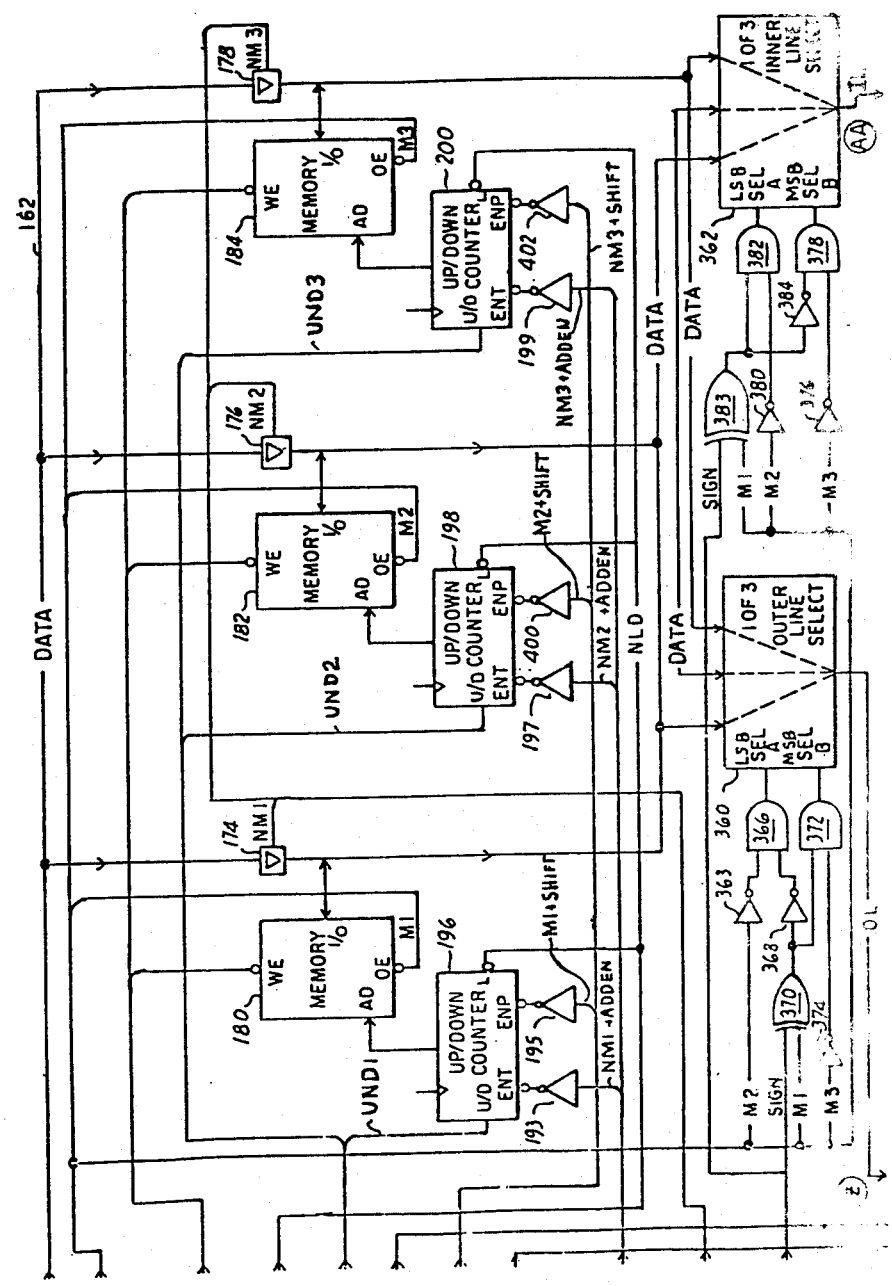
Figure 7:
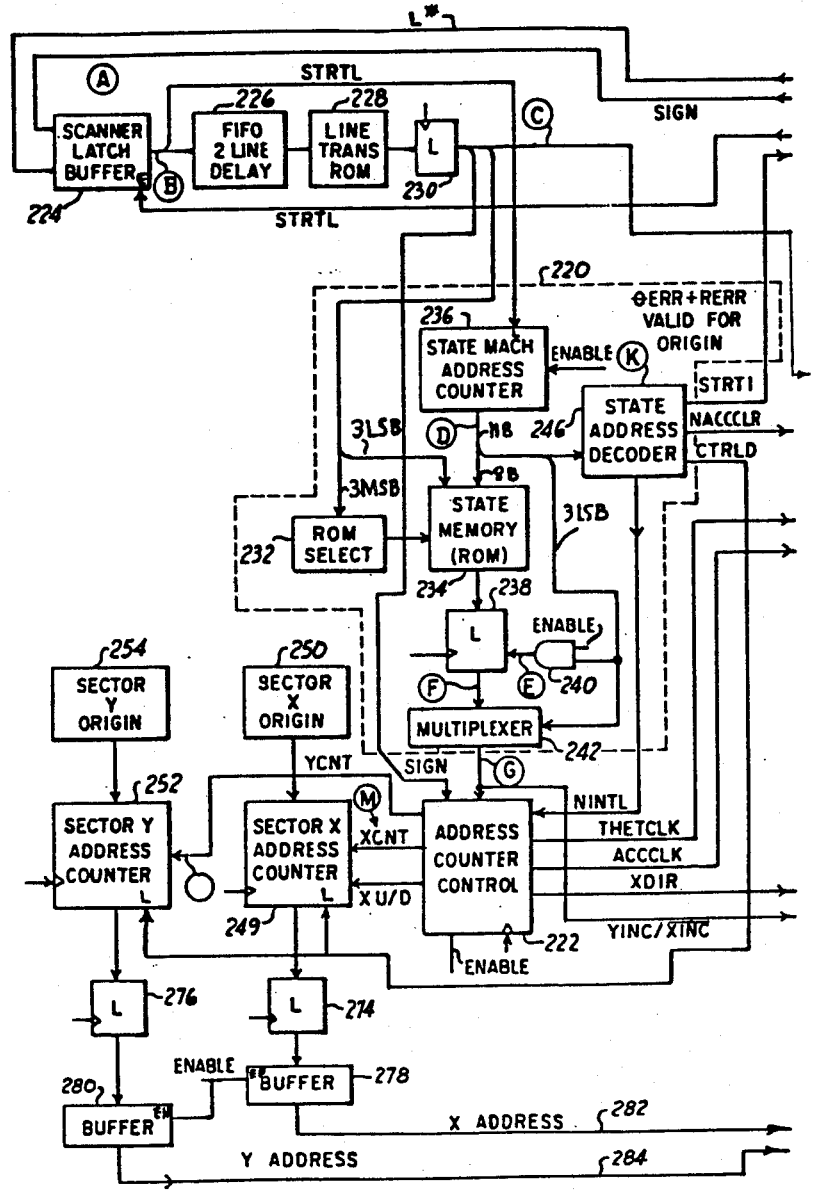
Figure 7A:
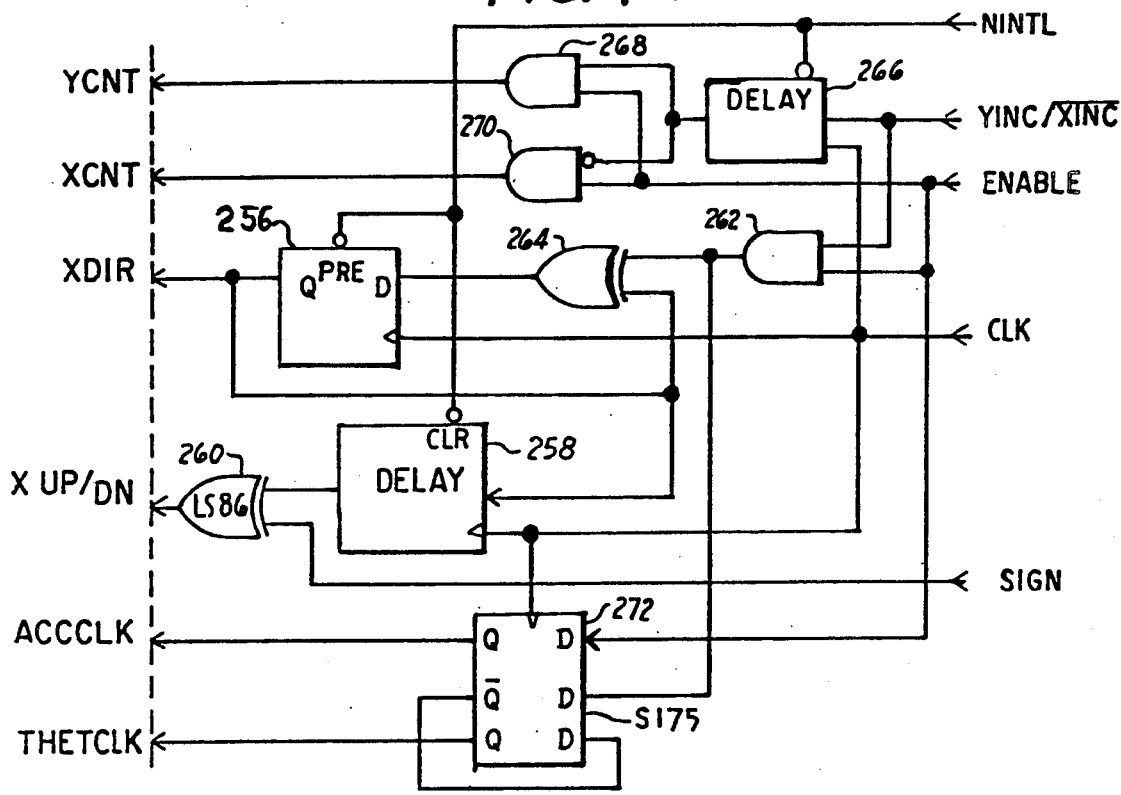
Figure 8B:
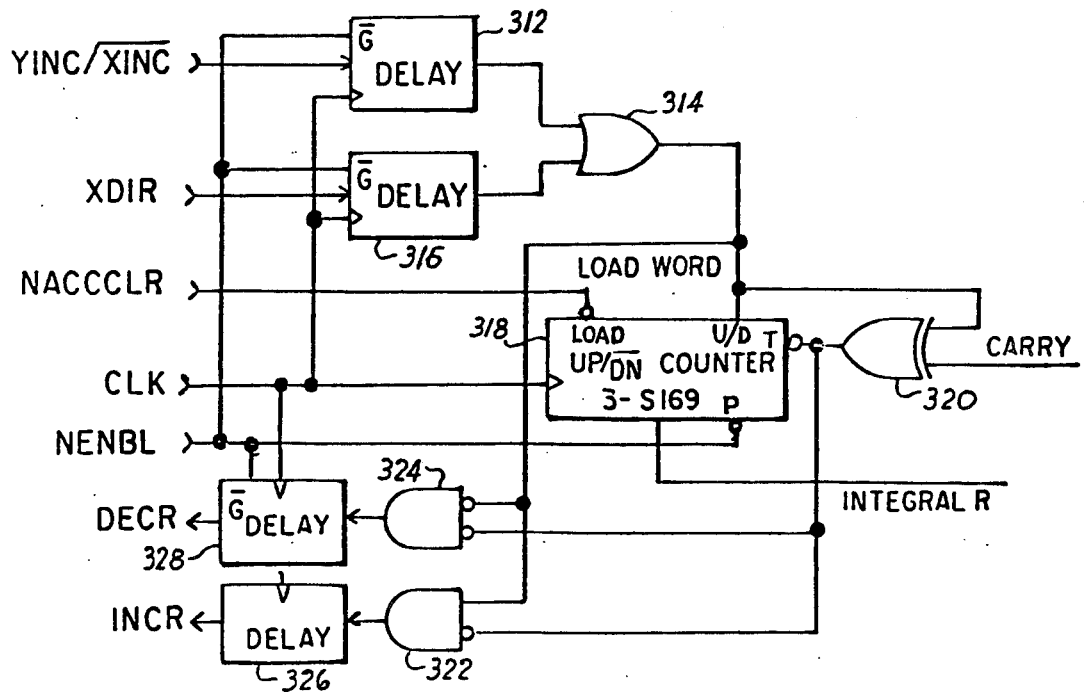
Figure 11:
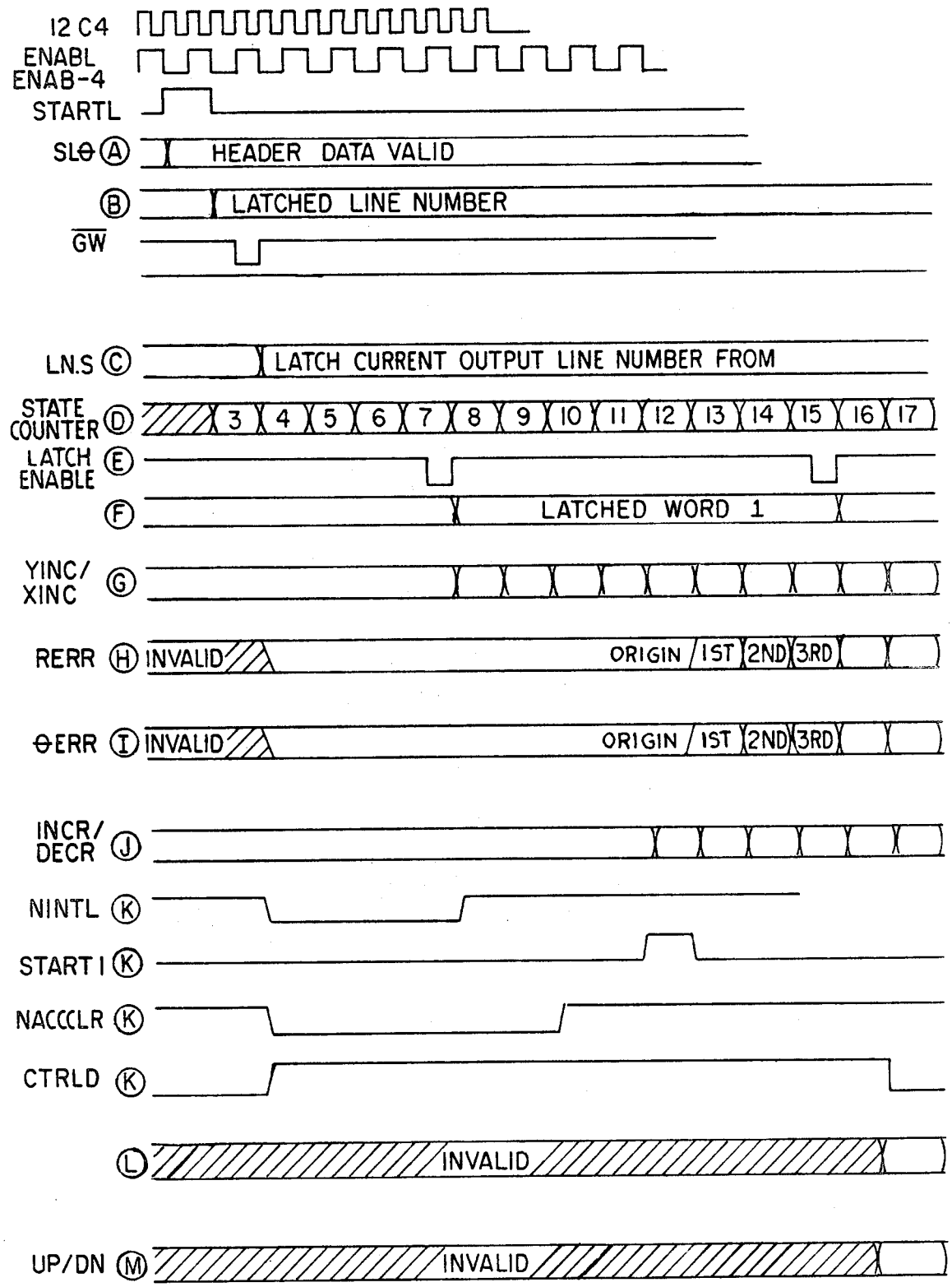
Figure 12:
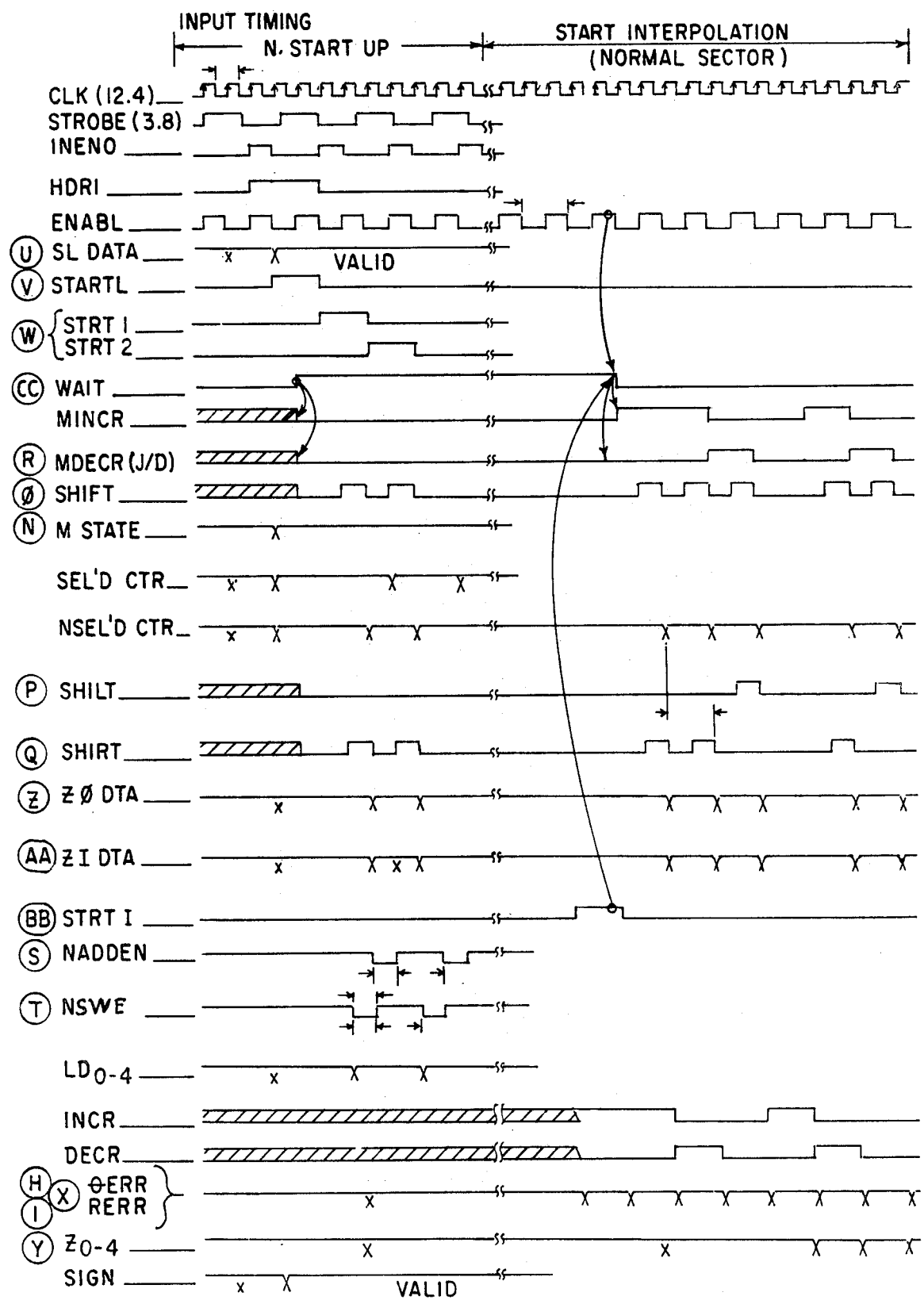
Figure 16:
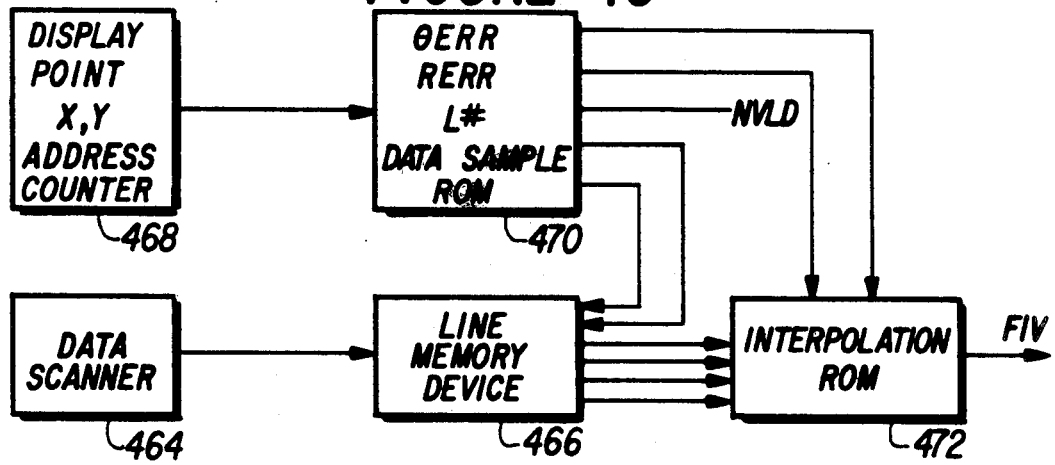
Figure 16A:
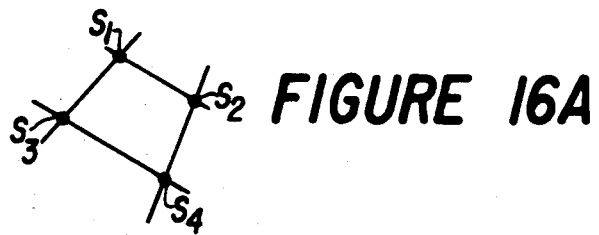
Figure 17:
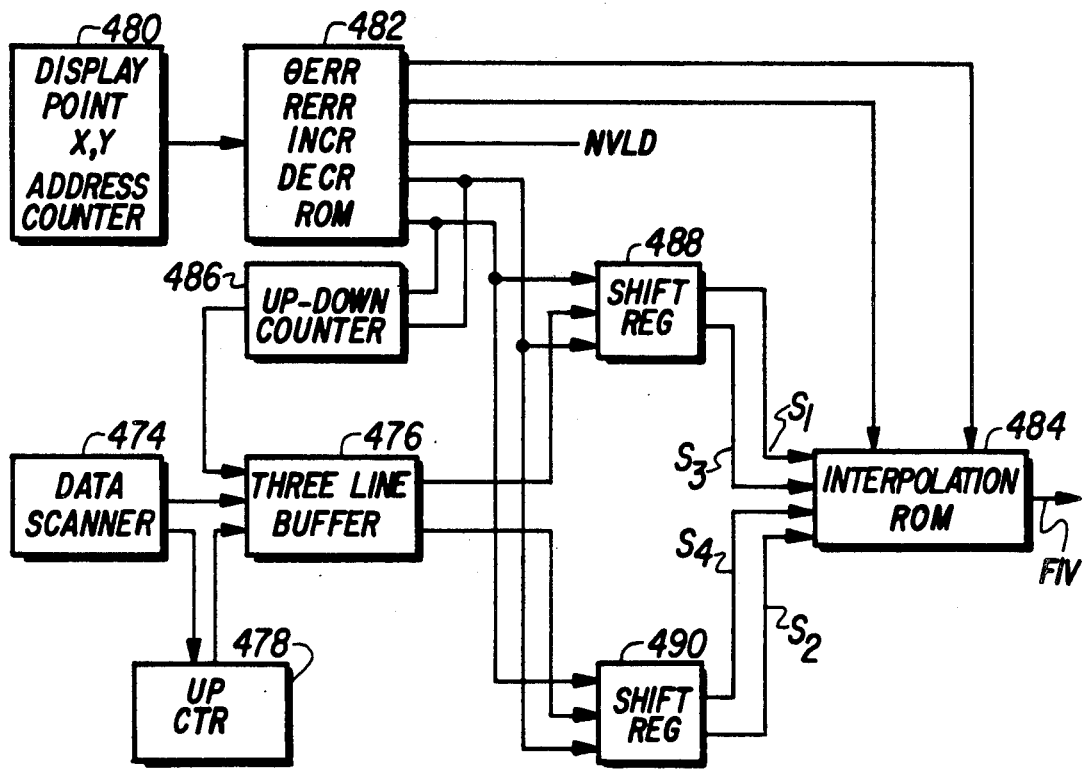
Figure 18:
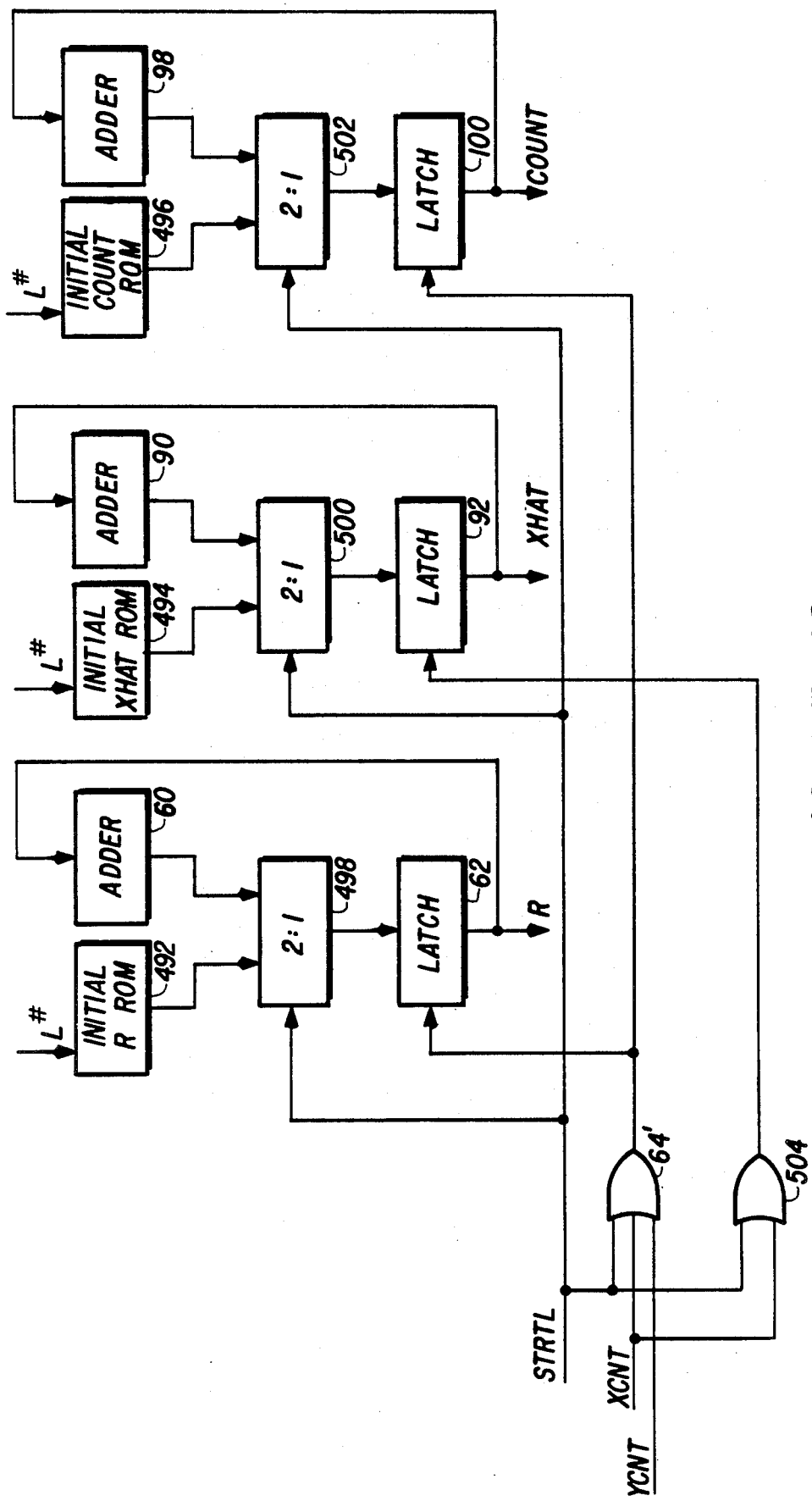

FIG. M, shown in FIG. 7, illustrates the orientation of FIGS. 5, 6, 7, 8 and 10 to form a complete diagram of the preferred embodiment of the invention;

FIGS. 5, 6, 7, 8 and 10 illustrate the details of a preferred embodiment of the invention;

FIG. 4A illustrates an alternative interpolation means that can be used in FIG. 4;

FIG. 5A illustrates one form of digital information that may be provided by a scanner;

FIGS. 6A and 6B are truth tables for the multiplexers of FIG. 6;

FIG. 7A illustrates the details of an address control counter used in FIG. 7;

FIGS. 7B, 7B$_1$, 7B$_2$ and 7B$_3$ illustrate the operation of a translation ROM of FIG. 7;

FIG. 8A is a truth table for the ROM of FIG. 8 used in computing the radial position of a display point;

FIG. 8B illustrates the details of a radius counter of FIG. 8;

FIG. 8C is a truth table for a ROM of FIG. 8 used for computing the angular position of a display point;

FIG. 9 graphically illustrates the operation of the preferred embodiment of the invention;

FIGS. 11 and 12 are graphs illustrating the timing of various signals;

FIG. 13 illustrates an alternative embodiment of the invention wherein fewer components are used to perform the interpolation;

FIG. 14 illustrates another alternative embodiment of the invention employing a single ROM for performing the interpolation;

FIG. 15 illustrates another alternative embodiment of the invention in which the values of RERR and $\theta$ERR as well as the interpolation are determined by a single ROM;

FIG. 16 illustrates a scan conversion system in which the values of $\theta$ERR, RERR, L# and data sample number for each display point are stored in a ROM and the data samples for all radial lines of a sector are stored in a memory;

FIG. 16A illustrates locations of data samples;

FIG. 17 illustrates a scan conversion system in which $\theta$ERR, RERR, INCR and DECR are stored in one ROM and the data samples are stored in a three-line buffer as in the system of FIGS. 5, 6, 7, 8 and 10; and FIG. 18 illustrates a way of deriving the values of R, XHAT and COUNT when the scan of display points is toward the origin.

DETAILED DESCRIPTION OF THE INVENTION

Figure 1:
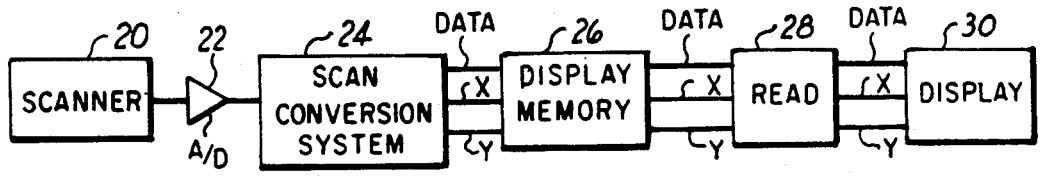
FIG. 1 illustrates the basic components of a scan converter system.
Figure 1A:
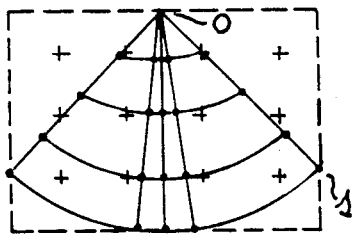
FIGS. 1A, 1B and 1C are graphic illustrations of the functions of the components of FIG. 1.

The block diagram of FIG. 1 illustrates the basic components of a digital scan conversion system of the type to which this invention pertains. A scanner 20 transmits acoustic pulses into the body of a patient by means not shown and produces an analog signal representing the amplitudes of echoes received from structures of the body located along a number of radial lines of a sector shown in FIG. 1A. Only a few radial lines are shown. As the analog signal is being received, uniformly spaced digital samples indicated by the dots in FIG. 1A are derived from it along each radial line by an A/D converter 22 and applied to a scan conversion system 24. Generally, as may occur in a system employing this invention, the first data sample is at the origin O of the sector and the other samples are at the intersections of the radial lines of the sector with equally spaced radial arcs so that data samples are also distributed along the radial arcs.

Figure 1B:
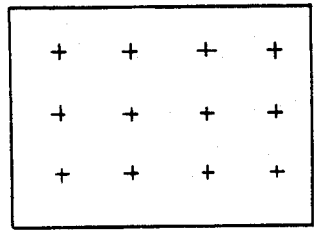
Figure 1C:
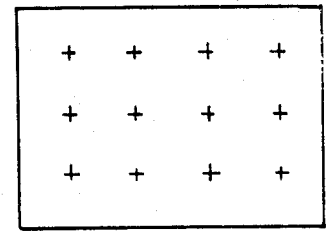

As pointed out in the discussion of the background of the invention, the function of a scan conversion system 24 is to write digital data values derived from the data samples into appropriate display points of a display memory 26 that are effectively located along orthogonal rows and columns as indicated by the +'s in FIG. 1B. In order to do this, the scan conversion system provides the data value to be written and the x,y coordinates of the display point on the display memory 26 where it is to be placed. Once stored in the digital memory 26, the data can be read out from appropriate x,y coordinate points by a reading device 28 and placed into corresponding coordinate points of a display means 30 that are indicated by the +'s of FIG. 1C.

Basic Principles of the Invention

Figure 2:
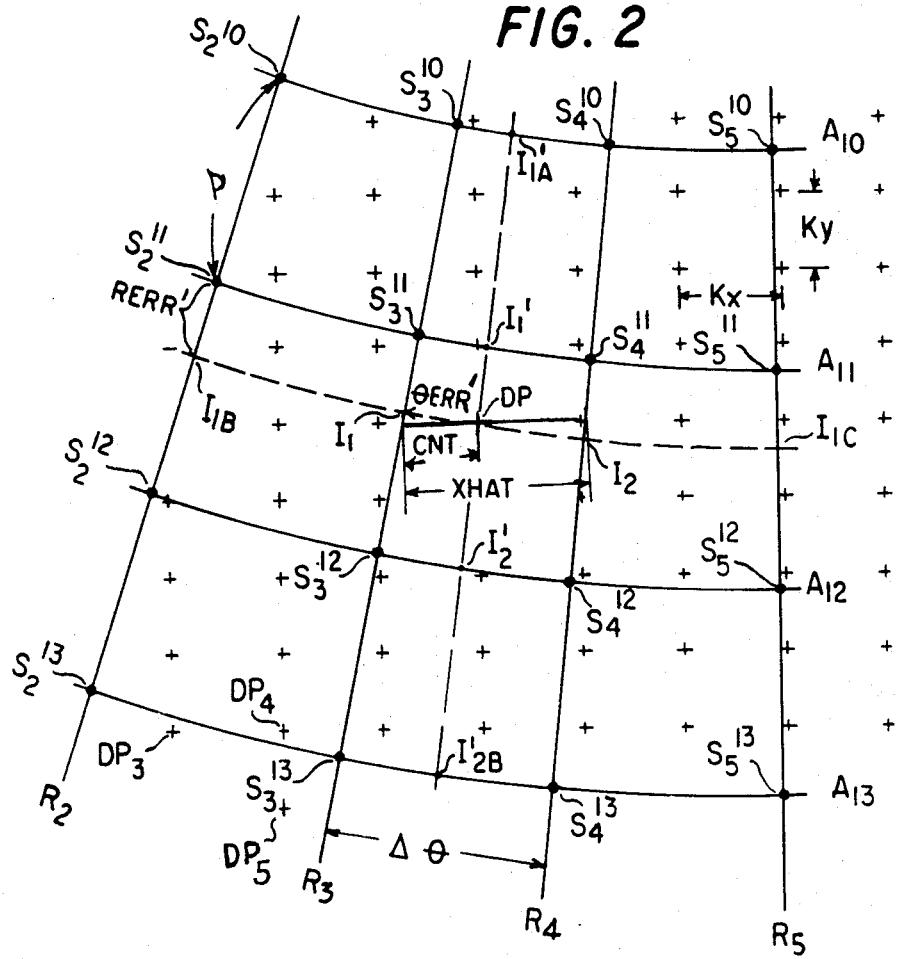
FIG. 2 is an illustration of radial lines and a field of display points arranged in rows and columns that is used in explaining the interpolations to be performed in accordance with the invention.

FIG. 2 is an enlarged view of a portion of the sector shown in FIG. 1A in which the data sample points are shown as dots appearing along radial lines $R_2$ through $R_5$ at intersections of these radial lines with radial arcs $A_{10}$ through $A_{13}$ that are uniformly spaced by a distance s. Each data sample point is indicated by a letter S having a subscript equal to the radial line on which it appears and a superscript equal to the radial arc on which it appears. The data sample points are thus also distributed along the radial arcs. The display points of a display memory such as 26 of FIG. 1 are indicated by +'s located in orthogonal rows and columns that are respectively parallel to x and y axes. In order to shorten the drawing, portions of the radial lines $R_2$ through $R_5$ have been omitted but, although not shown, the x axis passes through the origin O at which there is a display point. The spaces between rows of display points are $K_y$, and the spaces between columns of display points are $K_x$.

In order to determine a final interpolated data value to be used at a display point such as DP, a signal or value RERR' representing the radial distance between DP and the radial arc $A_{11}$ and a signal or value $\theta$ERR' representing the angular displacement between DP and the radial line $R_3$ are derived. Thus, RERR' and $\theta$ERR' represent the radial and angular positions respectively of the display point DP relative to $A_{11}$ and $R_3$. A first intermediate interpolated data value $I_1$ can be derived at the radial position of DP along the radius $R_3$ by linearly interpolating between the data samples at $S_3^{11}$ and $S_3^{12}$ in accordance with the following expression in which an * indicates the value of a data sample:

$$I_1 = \frac{S_3^{11*}(s\text{-RERR}') + S_3^{12*}\text{RERR}'}{s} \quad (6)$$

Similarly, a second intermediate interpolated data value $I_2$ can be derived at the radial position of DP along the radius $R_4$ by linearly interpolating the data samples at $S_4^{11}$ and $S_4^{12}$ in accordance with the following expression:

$$I_2 = \frac{S_4^{11*}(s\text{-RERR}') + S_4^{12*}\text{RERR}'}{s} \quad (7)$$

The final interpolated data value FDP for DP can be derived at its angular position by linearly interpolating the first and second intermediate interpolated data values $I_1$ and $I_2$ in accordance with the expression:

$$FDP = \frac{I_1(\Delta\theta\text{-ERR}') + I_2 \cdot \theta\text{ERR}'}{\Delta\theta} \quad (8)$$

Instead of calculating $\theta$ERR', a value COUNT, which is the distance between DP and $R_3$ as measured along the row of display points through DP and a value of XHAT which is the distance between $R_3$ and $R_4$ measured along the same row of display points are determined. It can be shown that COUNT is proportional to XHAT as $\theta$ERR' is proportional to $\Delta\theta$. Thus, the final interpolated data value at the display point DP can be determined from the following expression in which XHAT replaces $\Delta\theta$ of equation (8) and COUNT replaces $\theta$ERR':

$$FDP = \frac{I_1(\text{XHAT-COUNT}) + I_2 \cdot \text{COUNT}}{\text{XHAT}} \quad (9)$$

The final interpolated data value for the display point DP could just as easily be derived by reversing the order of interpolation, i.e., a first intermediate interpolated data value $I_1'$ could be derived at the angular position of DP along the radial arc $A_{11}$ by using the formula:

$$I_1' = \frac{S_3^{11*}(\text{XHAT-COUNT}) + S_4^{11*} \cdot \text{COUNT}}{\text{XHAT}} \quad (10)$$

and a second intermediate interpolated data value $I_2'$ could be attained at the angular position of DP along the arc $A_{12}$ by using the formula:

$$I_2' = \frac{S_3^{12*}(\text{XHAT-COUNT}) + S_3^{12*} \cdot \text{COUNT}}{\text{XHAT}} \quad (11)$$

so that the final interpolated value FDP is given by the following expression:

$$FDP = \frac{I_1'(s\text{-RERR}') + I_2'(\text{RERR}')}{s} \quad (11')$$

As will become apparent, the calculations of these equations can be more easily performed if the radial position is represented by a signal RERR=RERR'/s and the angular position is represented by a signal $\theta$ERR=COUNT/XHAT. RERR is the fractional position of DP between $A_{11}$ and $A_{12}$ and $\theta$ERR is the fractional position of DP between the radial lines $R_3$ and $R_4$. Thus, for example, equation (6) becomes $$I_1 = S_3^{11*}(1-\text{RERR}) + S_3^{12*} \cdot \text{RERR} \quad (6')$$

and equation (1) becomes $$FDP = I_1(1-\theta\text{ERR}) + I_2 \cdot \theta\text{ERR} \quad (9')$$

It will be noted in either method of calculation that the first intermediate interpolated data value is derived by interpolating data samples along one of the radial and angular directions that are on one side of DP in the other direction and that the second intermediate interpolated data value is derived by interpolating data samples that are on the other side of DP in the same one of the radial and angular directions. In the first method, the first intermediate interpolated value $I_1$ was derived by finding an interpolated value of $S_3^{11*}$ and $S_3^{12*}$ which are on the left side of DP in an angular direction; and the second intermediate interpolated data value $I_2$ was derived by interpolating $S_4^{11*}$ and $S_4^{12*}$ that are on the right side of DP in an angular direction. When the angle between $R_3$ and $R_4$ is small, $I_1$, $I_2$ and DP are in a substantially straight line as there is little difference between the cord and the arc. Similarly, in the second method, $I_1'$ was derived by interpolating $S_3^{11*}$ and $S_4^{11*}$ that are along the arc $A_{11}$ and on one side of DP in a radial direction; and $I_2'$ was derived by interpolating $S_3^{12*}$ and $S_4^{12*}$ that are along the arc $A_{12}$ and on the other side of DP in the radial direction.

Whereas the above description describes one way in which a scan conversion system incorporating this invention could operate, other ways will readily come to mind such as deriving $I_1$ by interpolating four data samples along $R_3$ and deriving $I_2$ by interpolating four data samples along $R_4$ or in the second method by interpolating four data samples along the arc $A_{11}$ to derive $I_1'$ and by interpolating four data samples along the arc $A_{12}$ to derive $I_2'$. Another method is to derive additional interpolated values $I_{1B}$ and $I_{1C}$ in the same manner as $I_1$ and $I_2$ were derived and to interpolate all of them in the angular direction to derive a final interpolated value at DP. Similarly, interpolated values $I_{1A}'$ could be derived from the data samples along $A_{10}$ and interpolated values $I_{2B}'$ could be derived from the data samples along $A_{13}$ and these could in turn be interpolated in the radial direction to derive the final interpolated data value at DP. Another method is to use data samples at four sample points farther away from DP, such as $S_2^{10}$, $S_5^{10}$; $S_2^{13}$ and $S_5^{13}$ that define an area containing DP.

A straight line function has been illustrated for the interpolation described, but any nonlinear method of interpolation may be used to obtain an interpolated value at the radial or angular position of DP. The type of interpolation used merely changes the weighting factor to be given to the data samples.

Basis of Calculation

Figure 3:
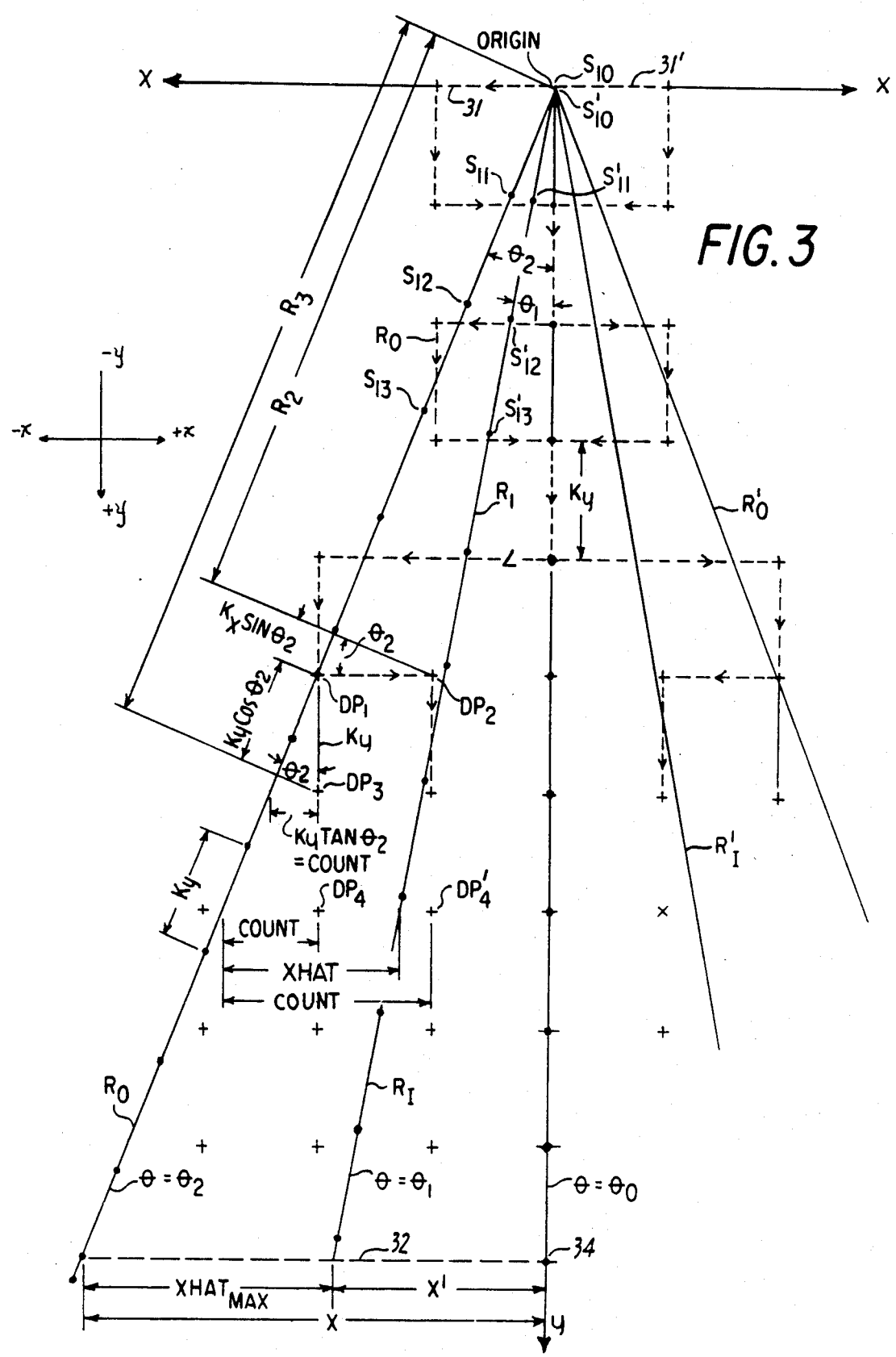
FIG. 3 shows two pairs of radial lines used in explaining the basic calculations used in the invention.

As previously pointed out, calculations of all the final interpolated display values in a sector by straightforward methods would require far too much time to permit real time operation for instruments such as an ultrasound scanner that scan one sector in a thirtieth of a second. Reference is now made to FIG. 3 for an explanation of the basis on which the calculations are made in accordance with this invention. Two radial lines from a scanner, an outer line $R_O$ and an inner line $R_I$ that defines a slice are illustrated as making angles of $\theta_2$ and $\theta_1$ respectively with a column of display points along the y axis which is the central line of the sector. In order to be able to illustrate the concepts involved, the angle $\theta_2 - \theta_1$ between the lines $R_O$ and $R_I$ has been greatly exaggerated, being about 10° rather than the ¾° or 1½° generally employed.

Calculation of RERR

The basis for the calculation of RERR can be understood by starting with a display point $DP_1$ of FIG. 3 that happens to be on the outer radial line $R_O$ and noting what occurs when a step is made along the x axis toward the origin O to an adjacent display point $DP_2$ that is a distance $K_x$ from the display point $DP_1$. If a perpendicular is dropped from $R_O$ through $DP_2$, the acute angle of the right triangle thus formed is $\theta_2$ and the side of the triangle opposite $\theta_2$ is $K_x \sin \theta_2$. Subtraction of this amount from the radius of the display point $DP_1$, whatever it is, yields in our calculation the lesser radius of the display point $DP_2$ that is indicated by the radial length $R_2$. That this is not precisely correct is clear from the fact that the true radial distance of $DP_2$ is the hypotenuse of the right triangle of which $R_2$ is one side and therefore less than the actual radius. If the step were from $DP_2$ to $DP_1$, i.e., away from the origin O, the amount $K_x \sin \theta_2$ would be added to whatever radius was calculated for $DP_2$. A step in the $+y$ direction of a length $K_y$ to $DP_3$ adds, in accordance with the method of calculation, a length of $K_y \cos \theta_2$, but this too can be seen to be slightly inaccurate because the radius $R_3$ of $DP_3$ is less than the true radius. The fact is, however, that these errors are negligibly small if $\theta_2 - \theta_1$ is 1½° or ¾° as usual.

Although the formulae and apparatus constructed in accordance with them utilizes the angle $\theta_2$ of the outer radial line of each slice in making the radius calculation, one could alternatively choose another angle "close to" $\theta_2$ in that it differs from $\theta_2$ by an amount less than $\Delta\theta$. Such a choice guarantees that errors within acceptable tolerances are maintained.

The radius at the origin O is zero. Therefore, if the display point scanning signals previously referred to cause a step-by-step scanning of the display points of the slice $R_O, R_I$ starting with the origin O as indicated by the dashed line 31, and if the value of $K_x \sin \theta_2$ is subtracted for each step to the right and added for each step to the left, and if $K_y \cos \theta_2$ is added for each step along the y axis away from the origin, the radius of any display point in the scanning path can be determined with sufficient accuracy consistent with the quantitative errors for a display point lying within the slice bounded by $R_O, R_I$.

Whereas the value of the radius of a display point may be used in a manner to be described to prevent the writing of data into the display memory, its more important function is to determine RERR so that the interpolations along the radial direction that were previously described can be performed. With a format where $|K_x| = |K_y| = |s| = 1$, RERR is merely the fractional part of the number representing the radius, but if $K_x$ is different from $K_y$ and from s, then normalization techniques can produce radius values measured in units of s so that the fractional part is still RERR. Thus, we have $$R_{j+1} = R_j - K_x \sin\theta_2 + K_y \cos\theta_2 \quad (12)$$

Calculation of XHAT

XHAT has previously been defined as the distance between radial lines of a slice such as $R_O$ and $R_I$ of FIG. 3 measured along a row of display points or along the x axis. If a perpendicular 32 is drawn from the y axis at the position of a display point 34, the value of XHAT for display points in the same row can be derived as follows. If the number of increments of $K_y$ between the origin O and the display point 34 is n, then as shown in FIG. 3

$$x = nK_y \tan\theta_2 \quad (13)$$

and $$x' = nK_y \tan\theta_1 \quad (14)$$

and $$\text{XHAT} = x - x' = nK_y \tan\theta_2 - nK_y \tan\theta_1 \quad (15)$$

From inspection, it can be seen that the value of XHAT increases a constant amount ΔXHAT for each change of $K_y$ along the y axis so that $$\Delta\text{XHAT} = \frac{nK_y\tan\theta_2 - nK_y\tan\theta_1}{n} \cdot K_y(\tan\theta_2 - \tan\theta_1) \quad (16)$$

Calculation of COUNT

As used in the system to be described, COUNT is the distance from the outer radial line such as $R_O$ to a display point as measured along a row of display points containing the display point for which a value of COUNT is sought. Since $DP_1$ of FIG. 3 is on the outer line $R_O$, its value of COUNT is zero. The value of COUNT for $DP_2$ is $K_x$. Thus, any step along a row of display points toward the central line of the sector increases the value of COUNT by $K_x$, see $DP_4$ and $DP_4'$ of FIG. 3, and any step away from it decreases the value of COUNT by $K_x$. When, however, the step is along a column of display points, or along the y axis, in a direction away from the origin O, such as a step from $DP_1$ to $DP_3$, the value of COUNT is increased by $K_y \tan\theta_2$.

The value of COUNT for the display point at the origin is zero. Therefore, if the values of $+K_x$, $-K_x$ and $K_y \tan\theta_2$ are selected as noted above, the value of COUNT will be attained. Note that we are inside the sector slice whenever $0 \leq \text{COUNT} < \text{XHAT}$ at any display point.

By dividing COUNT by XHAT, a fractional measure, θERR, of the angular position of a display point between the radial lines $R_O$ and $R_I$ of a slice is determined. Since RERR is a fractional measure of the radial distance of a display point between two data sample points, θERR and RERR can be used in angular and radial interpolations in the same way.

When the value of COUNT is being determined for slices in the right half of the sector, COUNT is still measured from the outer line, but as can be seen from FIG. 3, the outer line $R_O'$ is to the right of $R_I'$ rather than to the left of it as in the case of $R_O$ and $R_I$. By still measuring COUNT from the outside radial line $R_O'$, the same calculation will apply.

This is not to say, however, that the fractional angular position of a display point must be measured from the outer line $R_O$ or $R_O'$. It could, for example, always be measured with respect to the left radial line, which is $R_O$ in the left half of the sector and $R_I$ in the right half. The calculations would be the same as just described for the left half, but in the right half, $+K_x$ and $-K_x$ would have to be interchanged and $-\tan\theta_2$ would be used in place of $+\tan\theta_2$. The latter could be added to a ROM, as will be explained.

Whereas the final interpolated data values for display points close to the origin are generally unimportant, it is essential to obtain the values of RERR and θERR for these points as these values are needed if the recursive addition to derive the value of RERR and θERR required for calculating the final interpolated data values for display points that are of interest begins at the origin.

General System

The block diagram of FIG. 4 generally illustrates a scan conversion system incorporating the various aspects of this invention. Its function is to calculate on a real-time basis the final interpolated data value for each of the approximately 125,000 display points of a display memory that lie within a ninety-degree sector such as indicated in FIG. 1A that is scanned about thirty times a second by a radial scanner such as 20 of FIG. 1. This is accomplished by determining the final interpolated data values for each display point of a slice, i.e., those display points on or between a pair of radial lines, and repeating the operation for each successive slice.

In FIG. 4, a radial scanner 33 supplies analog data obtained along each successive radial line to an A/D converter 35 that provides digitized samples of the data occurring at uniformly spaced points along the radial lines as illustrated by the samples $S_{10}, S_{11}, S_{12}, S_{13}$ on the radius $R_O$ and the samples $S_{10}', S_{11}', S_{12}'$ and $S_{13}'$ on the radius $R_I$ of FIG. 3. Inasmuch as the data used in the calculations for each slice are different, a line identification means 36 is provided for deriving from the scanner 33 signal an identification of the line being scanned. This can be effected in a number of ways such as by assigning a digital number to each line or by identifying a given line in a sector and counting the lines as they are scanned. However derived, the line identification signal is used by a write control means 38 to direct the digital data samples from the A/D converter 35 to storage points in a memory 40 in such manner that their radial positions along the lines are identifiable.

The following description relates to a means for deriving the signals RERR and θERR that represent the radial and angular positions respectively of a display point that are used in the interpolation process as well as the means for obtaining data samples from the memory 40 that define an area containing the display point.

Means 42 derives from the radial scanner 33 a signal STRTL indicating the time when the scanner starts scanning along a radial line. In response to each signal STRTL, a means DPSG provides display point scanning control signals that represent the sequence of steps in one of the directions $+x$, $-x$, $+y$ or $-y$ that are to be taken from a given display point, such as one at the origin of the radial lines, in scanning through the display points of the slice corresponding to the line identified by the signal provided by a line identification means 36.

Although the sequence of steps would normally include those in $+x$, $-x$ and $+y$ directions as indicated by the display point scanning path illustrated by the dashed line 31 of FIG. 3, it would be possible for steps to be made in the $-y$ direction as well. Means 46 respectively provides a signal indicating that a step is taken along the x axis, means 48 provides a signal indicating whether the step is in the $+x$ or $-x$ direction, means 50 provides a signal indicating that a step is taken along the y axis, and means 52 provides a signal indicating whether the step is in the $+y$ or $-y$ direction. By applying the outputs of the means 46 and 48 to an x address counter 54, the x coordinate of the display point for which a final interpolated data value is to be calculated in a manner to be explained is identified with respect to the x coordinate of the initial display point; and by applying the outputs of the means 50 and 52 to a y address counter 56, the y coordinate of the same display point is identified with respect to the y coordinate of the initial display point. The outputs of the x and y counters 54 and 56 are respectively applied to address lines of a display memory DM so as to direct the final interpolated data value FDP for that point when it is determined to the proper location.

Calculation of Radii

Determination of the radius of each display point identified by the display point scanning signal provided by the generator DPSG may be effected as follows. The signal from the means 36 that identifies the line along which the radial position is to be determined in combination with the display point scanning control signal from the generator DPSG selects from a memory 58, which may or may not be a ROM, the appropriate one of values $+K_x \sin \theta$, $-K_x \sin \theta$, $+K_y \cos \theta$ or $-K_y \cos \theta$, as was discussed in connection with FIG. 3, for application to one input of an adder 60. The angle $\theta$ is the angle of a radial line that is reasonably close to the center angle of the slice. How close is determined by the amount of error that can be tolerated in the angular position. The output of the adder 60 is applied to a latch 62 that is operated whenever there is a step along the x or y axis, regardless of its direction, by connection of its clock input to the output of an OR gate 64 having its inputs respectively connected to the outputs of the x counter device 46 and the y counter device 50. The output of the latch 62 is connected to another input of the adder 60. Together, the adder 60 and latch 62 form an accumulator that produces a signal at the output of the latch 62 representing the radius of the display point by adding all of the values of $+K_x \sin \theta$, $-K_x \sin \theta$, $+K_y \cos \theta$ or $-K_y \cos \theta$ that were produced in response to each former step in the $+x$, $-x$, $+y$ and $-y$ directions along the scanning path determined by the scanning control generator DPSG.

Choice of Display Points

At this point, it should be noted that inasmuch as a final interpolated data value may be derived for each display point in the scanning path determined by the signals provided by DPSG, the time for making this computation for display points that are outside of the slice, hereinafter called overhead, should be minimized by using the following rules:

1. At sector apex, increment outside the outside line in the x direction.

2. If outside the outside line and heading outwards, drop vertically and reverse traverse direction in the x direction (change XDIR).

3. If heading towards the outside of a slice and no more points are within the slice farther out on the currently traversed raster and no farther points are on the succeeding line to be traversed, then drop vertically and reverse direction (change XDIR). If, however, another point is within the slice on the succeeding line, then continue traversal on the current line for another point, then follow Rule 2.

4. If heading towards the center of the sector, continue until you are within slice or inside inner line, drop vertically and reverse direction (change XDIR) after addressing the last display point within the current traversal which lies within the slice.

For points lying outside the slice, the final interpolated data value for such point should not be entered into the display memory DM because they may well be incorrect and may be read by a display memory scanner 66 and applied to display apparatus 68. It would be consistent with the invention to disable the means for calculating the final interpolated data value for the display points outside the slice instead of calculating the values and preventing the incorrect data from being stored in the display memory DM, but no time would be saved. These considerations apply to all the calculations.

Use of Radius R

As previously described, the value of the radius R of the display point designated by DPSG appears at the output of the latch 62. Bits representing R are applied to a magnitude comparator 70 where it is compared with the value of maximum radius $R_{MAX}$ which establishes the outer radial boundary for the sector. If this comparison shows that the radius R of a display point is less than $R_{MAX}$, the comparator 70 provides a signal ROK to one input of an AND gate 72, the output of which is applied to an enable input of the display memory DM. In a manner to be described, a signal THETOK, indicating that the display point is in the current slice, is derived and applied to the other input of the AND gate 72. Thus, both signals ROK and THETOK must be affirmative if the data value is to be written into DM. The signal ROK is not as important as THETOK because incorrect final interpolated data values for a few display points at the end of a slice do not present as much problem as an incorrect data value in the interior of the slice. The main advantage of ROK is that it smoothes the outer periphery of the sector.

Calculation of RERR

The value of R cannot be used directly for interpolation as reference to equation (6) shows that some signal must be derived that represents the relative radial position of the display point with respect to data sample points that are being used in the interpolation, e.g., the relative radial position of the display point DP of FIG. 2 with respect to the data sample points $S_3^{11}$ and $S_3^{12}$ when calculating the intermediate interpolated values $I_1$ and $I_2$. It would be possible to derive a signal representing the radial distance between the outer data sample point $S_3^{12}$ and DP for use in the interpolation of the invention, or to derive a signal RERR' representing the radial distance between DP and the inner data sample point $S_3^{11}$.

In the preferred embodiment of the invention to be described at a later point, $K_x = K_y = s$ so that the fractional part of the values appearing at the output of the latch 62 is RERR, i.e., the ratio of the distance between the display point and the inner arc to the distance s between adjacent arcs. In the general case, however, $K_x$ and $K_y$ can be different from each other and s. In this event, it is easier if $K_x$ and $K_y$ are each less than s because a change of $K_x$ or $K_y$ occurring in going from one display point to the next could change the calculated radius by an amount greater than 2s and thus make it necessary to take this fact into account in calculating RERR'.

In the general case illustrated in FIG. 4, $K_y$, $K_x$ and s may all have different values. The signal R at the output of the latch 62 is applied to one input of a difference calculator 74 and the output of a latch 76 is applied to the other. At the start of each radial line all latches are cleared by application of the signal STRTL to their clear terminals so that the initial output of the latch 76 is zero. A difference signal RERR', equal to the value of R minus the output of the latch 76, appears in one output 78 of the difference calculator 74, and a signal RDIR indicating whether R is increasing or decreasing appears on another output 80. The difference signal RERR' is applied to one input of a magnitude compare unit 81 and a value equal to s is applied to the other input. When RERR' > s, the magnitude compare unit 81 outputs a signal CROSSs or when RERR' < 0, unit 81 also outputs signal CROSSs, indicating that the value of RERR' is passing through an integral multiple of s in respectively increasing and decreasing directions. Thus, for example, a signal CROSSs would be produced either by scanning from display point DP4 of FIG. 2 to display point DP3, both of which are between the radial lines R2 and R3 or in scanning in the reverse direction from DP3 to DP4.

The input of the latch 76 is connected to the output of an ADD/SUBTRACT device 83 which has one input connected to the output of the latch 76, another input connected to receive a value of s, and a control input connected to receive the signal RDIR. Whenever RDIR indicates that R is increasing, the ADD/SUBTRACT device 83 produces at its output and at the input of the latch 76 the sum of the output of the latch 76 and s; and whenever RDIR indicates that R is decreasing, the ADD/SUBTRACT device 83 produces at its output and at the input of the latch 76 the difference between the output of the latch 76 and s. The clock input of the latch 76 is connected to receive the signal CROSSs so that when CROSSs occurs, the input of the latch is transferred to its output and to one input of the difference calculator 74.

The signal RERR representing the fractional distance of a display point such as DP of FIG. 2 between $A_{11}$ and $A_{12}$ is derived by dividing RERR' by s in a divider 77. But if $s = K_y = K_x$, RERR is simply the fractional part of R at the output of the latch 62 in which case the latch 76, the ADD/SUBTRACT device 83, the difference calculator 74, the magnitude compare device 81 and the divider 84 are not required.

Calculation of XHAT

The value of XHAT is the distance between radial lines measured along a row of display points including the one in question, such as illustrated in FIG. 2 or more clearly seen for the display points DP4 and DP4' of FIG. 3. XHAT equals the sum of $+\Delta$XHAT, $\Delta$XHAT being equal to $\tan\theta_2 - \tan\theta_1$, for each step in the y direction away from the origin and $-\Delta$XHAT for each step in the y direction toward the origin. As the value of $\Delta$XHAT varies for each slice, it is only necessary to apply the line identification signal from circuit 36 to a ROM 88 so as to select the value of $\Delta$XHAT for that line.

The output of the ROM 88 is applied to an accumulator comprised of an adder 90 and a latch 92. This accumulator works in a similar fashion to the adder 60 and the latch 62 which were used in the radius calculation. However, instead of being updated with every move in x and y, the latch 92 gets clocked (updated) only on movements in y.

Calculation of COUNT

The signal COUNT can be a distance measured along a row of display points between a display point in that row and either radial line of a slice. The line identification signal from the circuit 36, the display point scanning control signal from DPSG and the y up-down signal from the circuit 52 are applied to a ROM 96 so as to select one of the values $+K_x$, $-K_x$, $+K_y\tan\theta$ or $-K_y\tan\theta$ and apply it to the input of an adder 98. The line identification signal selects a term having a $\tan\theta_2$ corresponding to the angle $\theta_2$ used for the slice, and the signal from the y U/D circuit 52 combined with the display scanning control signal from DPSG selects the appropriate one of $+K_y\tan\theta$ and $-K_y\tan\theta$. The value of $+K_x$ or $-K_x$ is selected by the steps along the x direction made by the scanning control signal. The following tables indicate the input selection matrix for the ROM 96 under the stated conditions. Remember that $+x$ is a step to the right, increasing value of x, $-x$ is a step to the left along the x axis, $-y$ is a step toward the origin, and $+y$ is a step away from it along the y axis.

| COUNT Measured from the Outer Line in Both Quadrants | | | | |
|---|---|---|---|---|
| LN# | x DIR | y DIR | Left Quad Selection | Right Quad Selection |
| — | $-x$ | — | $K_x < 0$ | $K_x > 0$ |
| — | $+x$ | — | $K_x > 0$ | $K_x < 0$ |
| — | — | $+y$ | $K_y\tan\theta_2 > 0$ | $K_y\tan\theta_2 > 0$ |
| — | — | $-y$ | $K_y\tan\theta_2 < 0$ | $K_y\tan\theta_2 < 0$ |

| COUNT Measured from the Left Line in Both Quadrants | | | | |
|---|---|---|---|---|
| LN# | x DIR | y DIR | Left Quad Selection | Right Quad Selection |
| — | $-x$ | — | $K_x < 0$ | $K_x < 0$ |
| — | $+x$ | — | $K_x > 0$ | $K_x > 0$ |
| — | — | $+y$ | $K_y\tan\theta_2 > 0$ | $K_y\tan\theta_2 > 0$ |
| — | — | $-y$ | $K_y\tan\theta_2 < 0$ | $K_y\tan\theta_2 < 0$ |

| COUNT Measured from the Right Line in Both Quadrants | | | | |
|---|---|---|---|---|
| LN# | x DIR | y DIR | Left Quad Selection | Right Quad Selection |
| — | −x | — | $K_x>0$ | $K_x>0$ |
| — | +x | — | $K_x<0$ | $K_x<0$ |
| — | — | +y | $K_y\tan\theta_2>0$ | $K_y\tan\theta_2>0$ |
| — | — | −y | $K_y\tan\theta_2<0$ | $K_y\tan\theta_2<0$ |

The output of the ROM 96 is applied to an adder 98 having its output connected to a latch 100 that is clocked by a step in either the y or x directions by connection of its clock input via a lead 102 to the output of the OR gate 64. The output of the latch 100 is connected to an input of the adder 98 so as to form an accumulator that produces at its output a signal COUNT equal to the sum of all changes in the value of COUNT including negative values resulting from all previous steps from one display point to another.

Determination of $\theta$ERR

Although the values of XHAT and COUNT could be used directly by interpolation circuits simply by making the angular distances used in the interpolation formula COUNT and XHAT-COUNT, see equations (9), (10), (11) and (11'), it is generally simpler to derive a signal $\theta$ERR that represents the fractional distance of a display point from one line to the other, the particular one depending on the selection made above, by dividing COUNT by XHAT in a divider 104. Equation (9) becomes equation (9') using $\theta$ERR.

Is Display Point between Radial Lines of a Slice?

In order to determine whether a given display point is between the radial lines of a slice, the following means is provided. The most significant bit of COUNT at the output of the latch 100 is applied via an inverter 106 to one input of an AND gate 108. As is well known, this bit goes to "1" when the digital signal of COUNT becomes negative so that the output of 106 goes to a low state. In addition, the values of XHAT and COUNT are applied to a decision block 110 that outputs a high state if COUNT is less than XHAT and a low state if COUNT is greater than XHAT. Thus, if COUNT is negative or is greater than XHAT, a situation that occurs only if the display point is angularly outside the slice, the output THETOK? from the AND gate 108 is in a low state. THETOK? is applied to an input of the AND gate 72 which, it will be remembered, has ROK? applied to its other input. Thus, only if THETOK? is in a high state indicating that the display point is angularly inside the slice and ROK? is also in a high state indicating that the display point radius is less than $R_{MAX}$ will the AND gate 72 output a high state so as to cause the display memory DM to store a final interpolated data value supplied to it at the x,y address indicated.

Interpolation

A read control 82 obtains a plurality of data samples from a plurality of radial lines from the memory 40 under the control of RDIR and CROSSs and makes them simultaneously available at the inputs of interpolators 112 and 114. Two of the data points are located where a radial arc of less radius than the display point intersects the radial line of a slice; and two of the data points are located where a radial arc of greater radius intersects the radial lines of a slice. When the display point scanning control signal from DPSG causes the display point scan to cross the outer or inner radial arc, the signal CROSSs informs the read control 82 that a crossing has been made and the signal RDIR determines whether the crossing is in an outward or an inward radial direction. The read control then selects the proper data points so that the four data samples always define an area containing the display point. The newly selected data points can be the same as before, further out or closer in towards the apex of the sector depending on RDIR and the value of s. For example, if the initial four data display samples were $S_3^{11*}$, $S_3^{12*}$, $S_4^{11*}$ and $S_4^{12*}$ of FIG. 2 and the display point scan crossed from a display point within the area defined by these points to a point outside of the radial arc $A_{12}$, the read control 82 would drop the inner data samples $S_3^{11*}$ and $S_4^{11*}$, retain the samples $S_3^{12*}$ and $S_4^{12*}$ and add the data samples $S_3^{13*}$ and $S_4^{13*}$. Should the scan recross line $A_{12}$, the original four data samples are used. The intermediate interpolated values provided by 112 and 114 are applied to an interpolator 116.

With switches $s_1$ and $s_2$ in the position shown, 112 and 114 interpolate radially, 116 interpolates angularly and $s_3$ applies data samples on $R_3$ to 112 and data samples on $R_4$ to 114. With $s_1$ and $s_2$ in the other positions, the order of interpolation is reversed and $s_3$ applies inner data samples to 112 and outer samples to 114.

If the interpolations involving other or additional display points such as described in connection with FIG. 2 are to be made, it is apparent that more interpolators than 112 and 114 would be required and that the read control 82 would have to obtain the data samples from the memory 40 and make appropriate ones of them simultaneously available to the interpolators. As one skilled in the art would readily provide the required data sample selection and interpolation means, only one other combination, the one in FIG. 4A, is illustrated. In FIG. 4A, the first and second intermediate interpolated data values are derived from the data samples at four data sample points along each of the radii $R_3$ and $R_4$ of FIG. 2. Data samples $S_3^{10*}$, $S_3^{13*}$ are applied to an interpolator 118; data samples $S_3^{11*}$, $S_3^{12*}$ to an interpolator 120; data samples $S_4^{10*}$, $S_4^{13*}$ to an interpolator 122; data samples $S_4^{11*}$, $S_4^{12*}$ to an interpolator 124; and the signal RERR is applied to all the interpolators. The outputs of the interpolators 118 and 120 are connected to an adder 126 that produces a first intermediate interpolated data value $I_1$, and the outputs of the interpolators 122 and 124 are applied to an adder 128 that outputs a second intermediate interpolated data value. The interpolators 118 and 122 can take into account the different distances of the inner and outer data samples from DP as well as different weighting factors that are to be applied to them if such as desired.

PREFERRED EMBODIMENT

The Scanner Bus Signal

In view of the fact that the various trigonometric functions used in making the interpolations in accordance with this invention require information as to angles related to the radial line along which a scanner is producing data, it is essential that some means be provided for identifying the line being scanned. Various ways, such as producing a pulse on the first line of a sector and providing a count that is updated each time the scanner transmits an acoustic pulse into the body of a patient, could be used but in order to be able to format the sector under software control, each angle is uniquely labelled with a seven-bit word just prior to the receipt of data for that angle. The data is quantized to five bits. In order to minimize the number of distinct signal busses between a scanner and the scan converter of this invention, the angle and data bits share a common data transfer bus 133 as indicated in FIG. 5 which is twelve bits wide. The output of a scanner 134 of FIG. 5 is illustrated in FIG. 5A wherein it is seen that when the MSB has a value of 1, the bits 2 through 8 represent the line number; and when it has a value of 0, the bits 2 through 6 represent one of thirty-two levels for a data sample. In order to reduce the amount of trigonometric data that must be stored in the ROMs, advantage is taken of the angular symmetry about the central radial line of the sector and therefore bit number 1 is arbitrarily made to have a value of 1 when the line is in the left half of the sector and a value of 0 when it is in the right half. The center line of the sector has the bit set to 1. The LSB, bit number 11 in this case, contains pulses termed "STROBE" that occur during the time when the word contains line identification information as well as during the time when the word represents the value of a data sample.

Timing Signals

The scan conversion system is clocked by pulses CLK produced by a clock 136, but in order to provide sufficient time for each circuit to perform its function, the frequency of the output of the clock 136 is cut in half by a divider 138 so as to derive a signal ENABLE. The negative of this signal, NENBL, is provided by connecting an inverter 140 to the output of the divider 138.

Because the clock of the scanner 134 may not be in synchronism with the clock 136 of the scan converter, the LSB, STROBE, from the scanner 134 is applied to a synchronizer 135. The synchronizer may take a number of forms, but is herein comprised of a pair of D flipflops 132, 139 and an AND gate 141 coupled as shown. In order to control the sequence of operation of various portions of the scan converter circuit with respect to a word received from the scanner 134, the output of the AND gate 141, identified as INENABLE, is a synchronized STROBE and is applied to a shift register 142 that is clocked by pulses CLK. If the frequency of the clock 136 is 12.4 MHz, STROBE is made to have an active high for at least 80 ns and an active low of at least 80 ns so that the sequential pulses NINEN0, NINEN1 and NINEN2 at the output of the register are synchronous with the CLK. Each pulse is 80 ns low with the three pulses lasting not more than 240 ns. The inverted forms INEN0, INEN1 and INEN2 are respectively derived by inverters 144, 146 and 148. As will be seen, NINEN0 or INEN0 are used for enabling latches; NINEN1 or INEN1 are used for controlling writing functions; and NINEN2 or INEN2 are used for controlling counters.

Identifying the Line Number

The output INENABLE from the AND gate 141 is applied via an inverter 150 to an enable input of a latch 152 so as to latch the word present at the time on the scanner output. Bit number 1, SIGN, indicative of the half-sector in which the line is, and bits numbered 2 through 8 indicative of the line number, are conducted to a latch 154 so that when the latch 154 is enabled, the bits representing the line number L# appear on one output and the SIGN bit appears on the other.

Inasmuch as the bits numbered 2 through 6 represent line identification information at one time and the value of a data sample at another, it is essential that the latch 154 be enabled only when these bits represent the line number. This is accomplished by "ANDing" in a NAND gate 158 the MSB, herein designated as HDR1, with ENABLE and the output of an OR gate 156 to which INEN1 and INEN2 are applied. The reason for using INEN1, INEN2 in this manner is because INEN1 may come up in one of two stable states relative to the ENABLE signal. ENABLE has a period of 160 ns whereas INEN0 is 80 ns wide. Therefore, in order to insure that the line number gets latched synchronously with the ENABLE signal, both the INEN0 and INEN1 are needed. Also notice that the STRTL signal is generated in a similar manner. This signal will become clearer later. The reason for using ENABLE is to establish the overall pipeline timing for the hardware. By essentially dividing the 12.4 MHz clock by 2, a 160 ns pipeline time is established. Thus, each synchronous operation has 160 ns to achieve set-up, propagation delay, and hold time. The NAND gate 158 can only produce the low output required to enable the latch 154 when HDR1, the most significant bit, is 1. The data then present at the input of 154 is the scanning line information.

Extracting the Data

Bits numbered 2 through 6 are connected to the input of a latch 160 that is enabled by NINEN0 so that whether they represent line information or the value of data samples, they are transferred as DATA to a data bus 162. When these bits represent line information, they are prevented from being written into the line memories of FIG. 6 in a manner to be explained by a qualifying signal SWE which is derived by connecting an inverter 164 between a line 166 carrying HDR1 and one input of an AND gate 168, the other input of which is connected to INEN1. When the word from the scanner 134 represents line information, HDR1 is high so that SWE must be low; but when the word represents data, HDR1 is low so that SWE can become high when INEN1 occurs.

The Start of a Line

As previously pointed out, the calculation of RERR and $\theta$ERR that are used for the interpolation function are derived by successive addition or subtraction of certain stored values to respectively known initial values. Although these known initial values may be those for any display point, it is easier to use the origin of the sector as the starting point because the known values for RERR and $\theta$ERR at the origin are zero. However this is done, it is essential to know the data sample occurring at the start of a line. Since HDR1 occurs at each line start, it can be used to generate a signal STRTL (START LINE). One way is to connect an inverter 170 between the output of the NAND gate 158 and the input of a latch 172. While data is being received, HDR1 is low so that the output of the latch 172 is also low, but when a L# is being received, HDR1 is high so that when NENBL enables this latch, a high output STRTL will appear at its output. STRTL is used in FIG. 10 to initiate the calculations referred to.

Writing the Data Samples

Reference is now made to FIG. 5 and FIG. 6 for an explanation of one way of storing the data samples. In FIG. 6, the data bus 162 from FIG. 5 is connected to tri-state buffers or gates 174, 176 and 178 that are respectively connected to the I/O of the digital line memories 180, 182 and 184. Each line memory can store the 396 data samples along a line, and it is desired that data sampled from one radial line of the scanner 134 be written into one memory while the two previously written radial lines are being read to provide the data samples required for interpolation. The tri-state buffers require application of a low state to their enabling inputs for them to pass data to the line memories. One means for deriving the appropriate enabling signal is shown in FIG. 5. HDR1 from the lead 166 is applied to one input of a NAND gate 186, INEN0 is applied to the other and the output is applied to a low state activated MOD3 counter 188 that outputs a high state on one of its three output lines M1, M2 or M3. Each HDR1 received causes the NAND gate 186 to output a signal NLD to the MOD3 counter and causes it to shift the high state to the next output line. Thus, after three HDR1's the sequence repeats.

Enabling of the line memories 180, 182 and 184 so that data presented at their I/O can be written into them requires a low state to be applied to their write-enable terminals. Derivation of such signals is effected by respectively applying M1, M2 and M3 to inputs of NAND gates 190, 192 and 194 and applying SWE to their other inputs. It will be recalled that SWE is high only when data samples are on the data bus 162 so that the outputs of the NAND gates 190, 192 and 194 can go low and permit data to be written into the line memories only when data samples are on the data bus. This prevents line number data from being written into the memories 180, 182 and 184. Whichever of M1, M2 or M3 is high will cause its NAND gate to output a low state and enable the associated line memory to be written into. Thus, if M1 is high, the line memory 180 is enabled to receive data.

But because each line memory has a common I/O, it is also required that the output channel be disabled by application of a high state to its output enable terminal OE while that memory is receiving data samples. This is effected by applying M1, M2 and M3 respectively to the OE terminals of the line memories 180, 182 and 184. If, for example, M1 has a high state, the output channel of the line memory 180 is disabled.

Summarizing, M1, M2 and M3 become high in sequence. If M1 is high, the tri-state buffer 174 permits data samples to reach the I/O of the line memory 180, but the tri-state buffers 176 and 178 prevent data samples from reaching the I/O of their respective line memories 182 and 184. At the same time, the write-enable input of the line memory 180 receives a low state so that data samples can be written into the line memory 180. The output channel of the line memory 180 is disabled while the output channels of the line memories 182 and 184 are enabled. Thus, with M1 high, data samples can be stored only on the line memory 180, and M2 and M3 are low so that data samples previously stored in the line memories 182 and 184 can be read.

The question arises as to how to store the samples at sequentially arranged addresses. This is controlled by up/down counters 196, 198 and 200. In the first place, it should be noted that the signal NLD at the output of the NAND gate 186 is applied to a load input of the counters so as to make them all revert to zero count at the beginning of each line.

In order for these counters to be able to count at all, a low state must be present at both inverting inputs ENT and ENP. Assume, for example, that data samples are to be written into line memory 180 so that M1 is high. Under this condition, the input ENP of the counter 196 is low for the entire line because a signal M1+SHIFT to be described is coupled to ENP by an inverter 195. M1 is a constant high during the line and makes the state of SHIFT irrelevant. When writing, the count always increases so that UND1 should be high. UND1, UND2 and UND3 are derived by respectively connecting M1, M2 and M3 to one input of OR gates 202, 204 and 206 and a signal NMDECR, to be described, to the other inputs. Since M1 is high, the output of the OR gate 202 is high regardless of the state of NMDECR and the counter 196 counts up. The actual counting occurs in response to the signal NM1+ADDEN applied via an inverter 193 to the ENT input of the counter 196. Since NM1, the inverse of M1, is low and cannot make the counter 196 input ENT low, a count takes place each time ADDEN goes high. NM1+ADDEN, NM2+ADDEN and NM3+ADDEN are derived as follows. HDR1 is applied via an inverter 203 to one input of an AND gate 205 so that this input is high during the time data samples are being received. Each data sample is accompanied by a STROBE that produces the synchronized STROBE INENABLE which in turn produces INEN2. When INEN2 goes high, the output of the AND gate 205, which is the signal ADDEN, also goes high. ADDEN is applied to one input of each of the OR gates 207, 208 and 210, and signals NM1, NM2 and NM3 are respectively applied to the other inputs. The latter signals are derived by application of M1, M2 and M3 to inverters 212, 214 and 216. When writing into the line memory 180, M1 is high and NM1 low for the entire line and the output ADDEN of the AND gate 205 goes high in response to each INEN2 so that the counter 196 counts. Since, as has been explained, UND1 is high, it counts up. The effect of the various signals on the other line memories and counters will be explained in a section on reading data samples from the lines.

In the example just given, data samples were being written into the line memory 180. During the same time, data samples are read from the line memories 182 and 184. If the sequence of reading were always in one direction, the reading function would be explained at this point, but inasmuch as this is not the case, it is necessary to explain how signals INCR, DECR and SHIFT that control the reading function are derived.

Display Point Scanning Control Signal

In order to determine the signals just mentioned, means are provided for generating display point scanning control signals representing the step-by-step scanning along the rows and columns of display points that are required for proceeding from a given display point, such as the one at the origin of the sector, through the display points in a slice corresponding to a given line number. As previously noted, the display point scanning control signals may take different forms as a result of different sequences of x and y movements and can be generated by a computer or derived from a memory as in this illustration. The apparatus of FIG. 7 that is to be described includes a state machine 220 that provides a series of single bits that indicate by a 0 that the step is along the x axis and along a row of display point and by a 1 that the step is away from the origin along the y axis and along a column of display points. In this particular embodiment of the invention, the first step from the origin of the sector is to the left for a slice that is in the left half of the sector as indicated by the scanning path 31 of FIG. 3 and to the right for a slice in the right half of the sector as indicated by the scanning path 31' of FIG. 3. The scanning algorithm uses the concept that each time the y address is changed, the direction for the x counter is changed from its last setting, i.e., after the first y address change in path 31, the XDIR is changed such as to cause the x counter to count up, i.e., move closer to the center of the sector. Note that the y movements can be concatenated successively; however, each movement in y is an implied change in the XDIR so that when the state machine outputs a 0 (x movement), the x counter moves in the direction of the last implied x direction. Also, for slices on either side of the center line, y axis, by the same angle, the scanned paths are identical except that the direction of corresponding steps along the x axis are opposite, but the 1's and 0's from the state machine 220 are identical. A signal XDIR that is 0 for a step towards the center and 1 for a step towards the outside of the sector along the x axis is derived by an address counter control 222 from the output of the state machine 220 and the SIGN bit from latch 230. The address counter control 222, the details of which will be sown in FIG. 7A, also supplies a signal YINC/$\overline{\text{XINC}}$ representing the steps in x or y.

Refer now to FIG. 7 in detail. The bits L# representing the line number and the bit representing SIGN at the output of the latch 154 of FIG. 5 are connected to a scanner latch buffer 224 that is enabled by the signal STRTL from the latch 172 of FIG. 5 to pass the bits for these signals to a fifo buffer 226 that stores two line numbers since two successive radial lines of the scanner must be stored in two of the line memories 180, 182 and 184 of FIG. 6 before a slice is defined and ready for read-out. As each STRTL signal of a radial line occurs, the L#s in the fifo 226 are moved along. On the third STRTL of the sector, the L# for the first line of the sector is moved into a L# translation ROM 228. Its output is applied to a latch 230.

The purpose of the L# translation ROM 228 can be understood from a consideration of FIGS. 7B$_1$, 7B$_2$ and 7B$_3$. In the particular format used in this embodiment of the invention, the radial lines are assigned even numbers starting with the outer line in the left half of the sector being 1/120, as in FIG. 7B, where the 1 is the SIGN bit indicating that the line is in the left half, and 120 is the line number. Arbitrarily the center line is line 1/0. The outermost line in the right half of the sector, not shown, is 0/120. FIG. 7B shows the outermost slice in the left half of the sector formed by radial lines 1/120 and 1/118. While data samples are being read from the two of the line memories 180, 182 and 184 of FIG. 6 in which the data samples of lines 1/120 and 1/118 were stored, data samples from the dashed line 1/116 are being written into the third line memory. The various angular measurements used in the determination of RERR, COUNT and XHAT in a manner to be described are, in this particular embodiment, based on the angle between the outer radial line R$_O$ and the y axis.

The line translation ROM 228 is necessary for the following reason. All trigonometric functions are referenced to the outside line, i.e., on the left side of the sector, this means the oldest line number in the fifo 226. When the current output slice is as shown in FIG. 7B$_1$, the current output from the fifo 226 is line 1/2 which implies that the current angle is that of line 1/2. When the center line is crossed, FIG. 7B$_2$, the output of fifo 226 is 1/0; but the angle of 0/2 should be used because it has the same angle as 1/2 of FIG. 7B$_1$. In order to achieve this result, the line translation ROM 228 adds 2 to the line number, FIGS. 7B$_3$, and changes the sign to 0, i.e., 0/2 is outputted from the ROM 228 instead of 1/0 and has the same L# as 1/2 of FIG. 7B$_1$. The SIGN bit has no effect on the L# to be used but is delayed in the same way as the line number for reasons which will be explained later. The remaining lines on the right side have 2 added to them. All lines on the left side, excluding the center line, are transparent through the translation ROM 228.

The State Machine 220

The three most significant of the six bits at the output of the latch 230 that represent the line numbers are applied to a ROM select 232 so as to select one of eight ROMs used in the state memory 234. Each ROM in the state memory contains up to eight slices. The three least significant bits are applied to the memory 234 to select the portion within the selected ROM related to the particular slice. Each slice contains 256 eight-bit words so as to have a total of 2048 bits for the slice. Each bit corresponds to one step in the path to be scanned through the display points. It is 0 if the step is in either direction along the x axis, and it is 1 if the step is along the y axis. Remember that the particular x direction is determined by the total number of y movements since the origin.

The signal STRTL at the output of the scanner latch buffer 224 is applied so as to start a state machine address counter 236 to output an eleven-bit address at the rate of the ENABLE pulses (the pipeline time). Eight of these eleven bits are applied so as to select one of the 256 eight-bit words of each slice in sequence in the memory 234 and supply them to a latch 238. The three LSBs of the eleven bits at the output of the state machine address counter 236 are ANDed with ENABLE in an AND gate 240 to enable the latch 238 to pass the eight-bit word applied to it from the state machine memory 234 to a multiplexer 242 which selects the bits of the word in sequence under the control of the three LSBs and applies them to the address counter control 222. The output of the multiplexer 242 is a signal YINC/$\overline{\text{XINC}}$.

State Address Decoder

The eleven-bit word at the output of the state machine address counter 236 is applied to a state address decoder 246 which is a ROM so as to develop certain timing signals. When the count represented by the eleven-bit word reaches a predetermined value occurring at a time such that the calculation of $\theta$ERR and RERR of FIG. 8 will have been carried out in a manner to be explained, a signal STRTI, start interpolating, is sent to the reset input of a latch 248 in FIG. 5, the purpose of which will be explained subsequently. At an appropriate time, the decoder 246 sends, for reasons to be set forth, a signal NACCCLR to clear a counter and three latches in the circuits of FIG. 8 that determine R, RERR, COUNT and XHAT. The decoder 246 also outputs a signal NINTL that is connected to the address counter control 222 so as to initialize its output at a proper time and a signal CTRLD that repeatedly sets an x address counter 249 to the x address of the origin of the sector as determined by a source 250 and sets a y address counter 252 to the y count of the origin as determined by a source 254 at the beginning of each line.

Address Control

A will be explained in connection with FIG. 7A, the address counter control 222 provides a signal XCNT to the counter 249 for each 0 in the output of the multiplexer 242 and a signal YCNT to the y counter 252 for each 1 in the output of the multiplexer 242. The address counter control 222 also supplies a signal XU/D to the x counter 249. In addition, the address counter control 222 provides a signal XDIR that together with YINC/$\overline{\text{XINC}}$ from the multiplexer 242 defines paths such as 31 and 31' of FIG. 3 in response to the output of the multiplexer 242 and the signal SIGN from the latch 230. XDIR and YINC/$\overline{\text{XINC}}$ are used in a manner to be explained to identify the value of the trigonometric function used by the circuits of FIG. 8 that determine the values R, RERR, XHAT and COUNT. A signal ACCCLK provided by the address counter control 222 clocks the latches of accumulators of FIG. 8 used in determining the value of R and COUNT, and a signal THETCLK provided by the control 222 is used to clock a latch of an accumulator of FIG. 8 used in determining the value of XHAT.

Refer now to FIG. 7A. At the start of every line and therefore at the start of a new slice, the signal NINTL from the state address decoder 246 of FIG. 7 goes low and is applied to the preset input of a D flipflop 256 so as to make XDIR go to a high state signalling a step along the x axis toward the outside radial line, but the direction with respect to the origin has not been determined. NINTL also clears an eight-stage delay 258 having its output connected to one input of an XOR gate 260 and an input connected to the output of the flipflop 256 where XDIR is. The other input of the XOR gate 260 is connected so as to receive the SIGN bit from the latch 230 of FIG. 7. The output of the XOR 260 is XUP/$\overline{\text{DN}}$. If the line is in the left half of the sector, SIGN is high so that the output of the XOR 260 is low signifying a count down, i.e., to the left. If the line is in the right half of the sector, SIGN is low so that the output of the XOR 260 is high signifying a count up.

Control of XDIR is achieved as follows. YINC/$\overline{\text{XINC}}$ from the multiplexer 242 of FIG. 7 is applied to one input of an AND gate 262 and ENABLE is applied to the other. If the next step is still outward, YINC/$\overline{\text{XINC}}$ is 0 so that the output of the AND gate 262 is low. This output is applied to one input of an XOR 264 and the other input is connected to XDIR at the output of the D flipflop 256. Since XDIR is high for an outward movement, the output of the XOR 264 is high and XDIR remains high. But if YINC/$\overline{\text{XINC}}$ is 1, indicating a movement away from the origin along the y axis, the output of the AND gate 262 is now high when an ENABLE occurs, causing the output of the XOR 264 to become low and make XDIR low signifying a step toward the center of the sector with the next movement in x.

Now that the direction of a step along the x axis and XUP/$\overline{\text{DN}}$ is known, it remains to provide the signal XCNT for every step in x. To do this, YINC/$\overline{\text{XINC}}$ is applied to a nine-stage delay 266 that is also cleared by NINTL. The output of the delay 266 is connected to one input of an AND gate 268 and to an inverting input of an AND gate 270, and ENABLE is applied to the other inputs of both. If YINC/$\overline{\text{XINC}}$ is low, the output of the AND gate 268 is low so that there is no count in y, but the output of the AND gate 270 is high so that XCNT is high and causes the sector x address counter to count up or down, depending on whether XUP/$\overline{\text{DN}}$ is high or low.

If YINC/$\overline{\text{XINC}}$ is high indicating a step in y, the output of the AND gate 268 goes high causing the sector y address counter to count up, the only way it can go in this particular embodiment.

Figure 10:
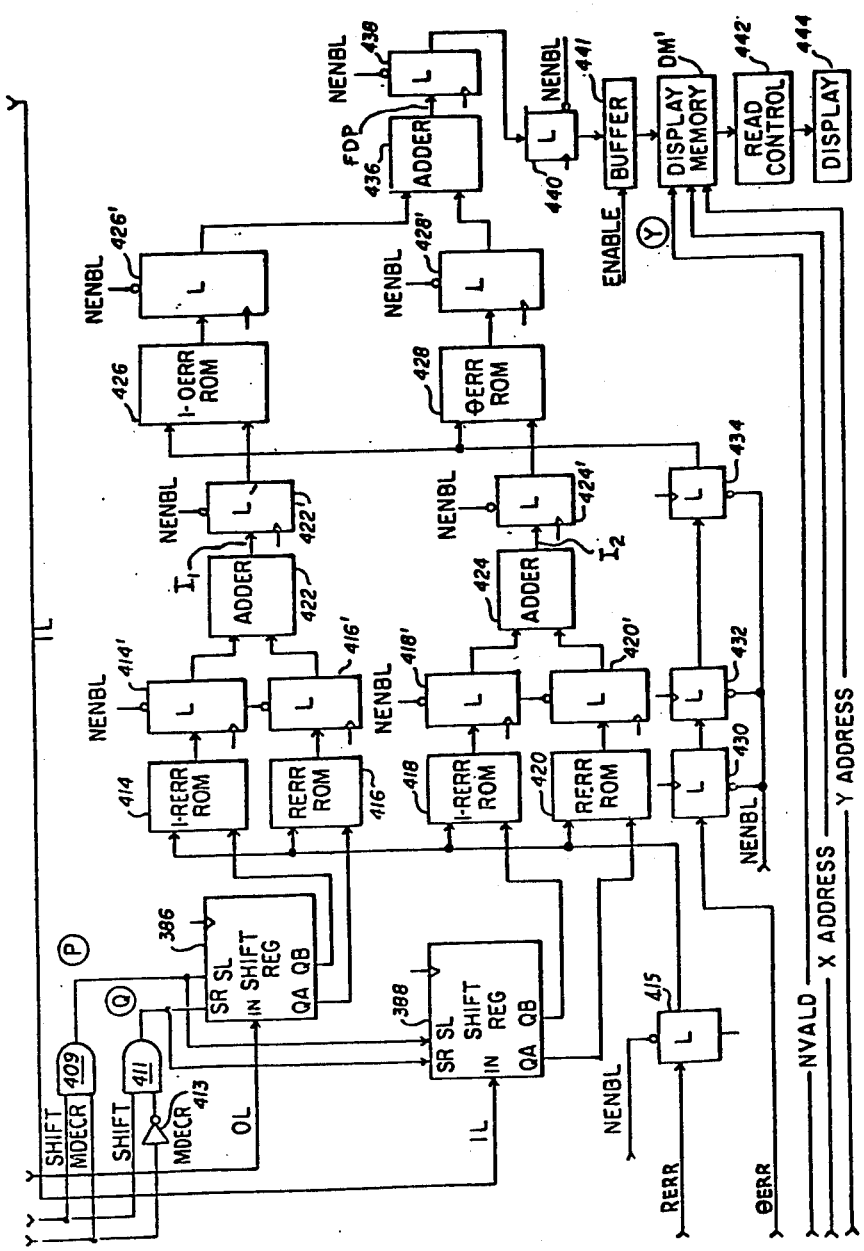

The purpose of the delays 258 and 266 is to allow for previous data to clear through the interpolators of FIG. 10. They are clocked by CLK after ENABLE qualifications. However, the D flipflop 256 is clocked by CLK only.

CLK is also applied to the clock input of a synchronizer 272 having one D input connected to ENABLE so as to produce a signal ACCCLK at the corresponding output. Another D input of the synchronizer 272 is connected to the output of the AND gate 262, the corresponding $\overline{Q}$ output is connected to a third D input, and its corresponding Q output provides the signal THETCLK.

The outputs of the x and y address counters 249 and 252 of FIG. 7 are respectively connected to latches 274 and 276 that, in turn, are respectively connected to buffers 278 and 280, all of which have ENABLE applied to their enable inputs. Thus, at each ENABLE, the x and y addresses are respectively applied to leads 282 and 284 that pass along the bottom of FIG. 10 to a display memory DM' of FIG. 11.

Determination of R and RERR

Reference is now made to FIG. 8. The L# bits from the output of the latch 230 of FIG. 7 and the display point scanning control signals XDIR and YINC/$\overline{\text{XINC}}$ from the address counter control 222, also of FIG. 7, are supplied to the input addresses of a ROM 286 which has stored therein values of $+\sin\theta$, $-\sin\theta$ and $+\cos\theta$ for the angle $\theta$ to be used with each L#. FIG. 8A illustrates the truth table for a given line that shows the outputs of the ROM 286 for the different combinations of the bit values of XDIR and YINC/$\overline{\text{XINC}}$. The ROM can be programmed to supply the appropriate twelve-bit output. The twelve bits are used to define the fractional numbers emerging from the ROM 286 and are applied to the input of a latch 288 and its output is applied to one input of an adder 290. A latch 292 is coupled between the output of the adder 290 and another input thereof so as to form an accumulator. The output of latch 292 thus contains the fractional portion of the current radius of which the five MSB bits are the desired signal RERR. It is expressed with five bits as that has proven sufficiently accurate, but the addition has used all twelve bits so as to avoid too great an accumulative error, a situation that can exist since there are over a thousand sines and cosines to be added and/or subtracted. Note that the latch 292 is cleared at the beginning of a line by NACCCLR that is derived from the state address decoder 246 of FIG. 7 and that it is clocked by ACCCLK derived from the address counter control 222 of the same figure. As seen in FIG. 7A, NACCCLR is derived from ENABLE which controls the rates at which the steps through the display points are taken. Thus, every movement in x and y causes an incremental amount ($\pm\sin\theta$, $+\cos\theta$) to be added to the past calculations of radius. As will be shown, the integer part of the radius calculation is kept in a radius counter 294 under command of the accumulator carry, XDIR and YINC/$\overline{\text{XINC}}$.

The values of $K_x$, and $K_y$ and the separation between data samples along the radial lines are all equal to unity in this particular example so that the connection of the signals YINC/$\overline{\text{XINC}}$ and the carry output of the adder 290 to the radius counter 294 will cause it to count the number of carries and produce a signal R equal to the integer number of data sample separations in the radius of each display point. The radius counter 294 also outputs a signal INCR when the radius R increases through an integral value of R and a signal DECR when the radius decreases through the integral value of R. The signal R is compared in a comparison circuit 296 with a radius limit signal from a source 298 so as to produce a high state whenever the radius R of a display point exceeds the specified limit. The output of the comparison circuit is ROK?.

The signals RERR, INCR, DECR and ROK? are passed through latches 300 and 302. The signal RERR is shown passing to interpolation means of FIG. 10 and ROK? is passed via delay stages 304 to one input of a NAND gate 306. A signal THETOK? which is derived in a manner to be explained indicates, when high, that a display point is in the slice. THETOK? is applied via the delay stages 304 to the other input of the NAND gate 306. The output of the gate 306 is applied to a latch 308, and its output is applied to a buffer 310. Thus, if either ROK? or THETOK? are low, the output NVALD? of the buffer 310 will be high. NVALD? is conducted to a display memory DM' of FIG. 10. If NVALD? is low, the final interpolated data value that is derived for the display point by the interpolation means of FIG. 10 is entered into the display memory DM'. The signals INCR and DECR are used to control the reading function of two of the line memories 180, 182 and 184 of FIG. 6 via circuits in FIG. 5.

The Radius Counter 294

FIG. 8B illustrates one arrangement of logic circuits for deriving from YINC/$\overline{\text{XINC}}$ and the carry signal from the adder 290 the signals R, INCR and DECR. The carry signal is 1 if the radius in the adder 290 is increasing and passes through an integer value; the carry signal is 0 if the radius is increasing and does not pass through an integer value. Conversely, the carry signal is 0 if the radius in the adder 290 is decreasing and does pass through an integer value, and the carry signal is 1 if the radius is decreasing and does not pass through an integer value. If the fractional part of the radius were zero, then the radius counter output indicates the radius of a display point which would equal the radius of one of the data sample points.

YINC/$\overline{\text{XINC}}$ is applied via a delay 312 of two stages to one input of an OR gate 314, and XDIR passes through a delay 316 to the other input of the OR gate 314. The output of the OR gate 314 is connected to an up/down control input of an up/down counter 318 and to one input of an XOR 320. The other input of XOR 320 is connected to the carry output of the adder 290 and the output of XOR 320 is connected to inverting inputs of AND gates 322 and 324 different from the inputs to which OR 314 is connected. The output of the OR gate 314 is connected to a different inverting input of the AND gate 324 and to a non-inverting input of the AND gate 322. NENBL from FIG. 5 is applied to the $\overline{\text{P}}$ enabling input of the counter 318, and the output of the XOR 320 is connected to the $\overline{\text{T}}$ enabling input of the same counter. The signal INCR is at the output of a two-stage delay 326 connected to the output of the AND gate 322, and the signal DECR is at the output of a two-stage delay 328 connected to the output of the AND gate 324. CLK is applied to the clock inputs of the delays 312, 316, 326 and 328 as well as to the clock input of the up/down counter 318, and NACCCLR is applied to the $\overline{\text{L}}$ input (load) of the counter. If the radius does not pass through a radial boundary such as the radial arcs of FIG. 3, both INCR and DECR will be 0, but if it increases through a radial boundary, INCR will be 1 and DECR will be 0; and if it decreases through a radial boundary, INCR will be 0 and DECR will be 1.

Determination of XHAT

Refer again to FIG. 8. The values of $\Delta$XHAT which are equal in this embodiment to tan $\theta_2$ − tan $\theta_1$, where $\theta_2$ is the angle from the center of the sector to the outer line of a slice and $\theta_1$ is the angle of the inner line, are stored in a ROM 330 for each radial line. Application of the L# signal from the output of the latch 230 of FIG. 7 to the address input of the ROM 330 selects the corresponding value of $\Delta$XHAT. The output of the ROM 330 lasts for an entire line and is applied to the input of an adder 332. The output of the adder 332 is applied to a latch 334 that is cleared by NACCCLR from the state address decoder 246 and is clocked by THETCLK from the address counter control 222, both of which are in FIG. 7. The output of the latch 334 is connected back to another input of the adder 332 so as to form an accumulator that produces at the output of the latch 334 the value of XHAT which is the sum of $\Delta$XHAT for each step in y since THETCLK clocks the accumulator with every y movement. A larger number of bits are used in the feedback to the adder 332 so as to prevent too great an accumulated error. Sixteen bits are used in this accumulator which accounts for the fact that four MSB bits are used for the integer part of XHAT.

Determination of COUNT

The signals representing the L# from the latch 230 of FIG. 7 and the signals YINC/$\overline{\text{XINC}}$ from the address counter control 222 of the same figure are applied to a ROM 336 so as to select one of the value +1, −1 and tan $\theta_2$ as indicated in FIG. 8C. The angle $\theta_2$ is the angle between the outer line of a slice and the central line of the sector and therefore the value of +tan $\theta_2$ depends on the L# selected.

A latch 338 is connected between the output of the ROM 336 and the input of an adder 340, and the output of the adder 340 is conducted to a latch 342. The latch 342 is cleared by NACCCLR from the state address decoder 246 of FIG. 7 and is clocked by a signal ACCCLK from the address counter control 222 of FIG. 7. The output of the latch 342 is connected to another input of the adder 340 so as to sum all the values selected from the ROM 336 for each step indicated by the display point scanning control signals YINC/$\overline{\text{XINC}}$ and XDIR. This is the value COUNT as measured from the outer line of a slice whether it is in the left half or the right half of the sector. Sixteen bits are used in the feedback loop as compared to eight for the sum so as to reduce accumulated error. Four bits are used for the integer portion of COUNT. Unlike RERR and XHAT, however, COUNT can have a negative value when the display point is outside the outer line of a slice. Therefore, the MSB bit is provided at the output of the latch 342 to indicate whether the value of COUNT is plus or minus.

Determination of θERR

θERR is actually COUNT/XHAT as previously explained. This division could be done directly but this would involve a sixteen-by-sixteen bit division. Since this accuracy is not needed in this embodiment, five-bit accuracy being sufficient, an appropriately selected five-bit field from both COUNT and XHAT will provide the necessary bit resolution in the divider. Since XHAT is the larger of the two numbers and non-negative, it is simply left-shifted until the MSB is non-zero, simple magnitude scaling. COUNT is then shifted the same amount. The purpose of 344, 346 and 348 is to provide the capability to shift from 0 to 3 shifts. The five-bit outputs of the ROMs 346 and 348 are passed through a latch 350 to a divider ROM 352 that divides the scaled COUNT by the scaled XHAT and applies the result to a latch 354 that outputs the desired signal θERR which is conducted to the interpolation pipeline of FIG. 10.

In order to derive the signal THETOK? that indicates whether the display point is angularly within the slice, the bit representing the sign of COUNT is conducted through an inverter 349 and the latch 350 to an AND gate 356. If COUNT is positive, this bit is high to indicate that the display point is not outside the outer line ($\theta_2$); but if COUNT is negative, the input to 356 is low deasserting THETOK?.

A comparison circuit 358 is connected to receive COUNT and XHAT and outputs a high bit if COUNT is less than XHAT, thereby indicating that the display point is not inside the inside line of the slice, and a low bit if COUNT is greater than XHAT indicating that the display point is inside the inside line. This bit at the output of the comparison circuit 358 passes through the latch 350 and is connected to another input of the AND gate 356. Its output is passed through the latch 354 to provide the signal THETOK? which, as previously noted, passes through the delay stages 304 to a different input of the NAND gate 306 than the input to which ROK? was applied.

Reading from the Line Memories

As previously noted, the final interpolated data value for each display point is derived in accordance with this embodiment of the invention by interpolating two pairs of data samples that define the sub-slice in which the point is located. Thus as illustrated in FIG. 9, the final data values of $DP_5$ and $DP_6$ are derived from data samples $S_2$, $S_3$, $S_2'$ and $S_3'$ defining one sub-slice, but the final data value for $DP_7$ is derived from data samples $S_1$, $S_2$, $S_1'$ and $S_2'$ that define the previous sub-slice. Inasmuch as $DP_8$ is in the same sub-slice as $DP_5$ and $DP_6$, its final data value is derived from the same data samples that they were, namely, $S_2$, $S_3$, $S_2'$ and $S_3'$. Thus, the means for reading the data samples from the line memories 180, 182 and 184 of FIG. 6 must be capable of retaining, advancing or retarding the data samples selected along each radial line of a slice.

Selection of the two of the line memories 180, 182 and 184 from which data samples are to be read is determined by which two of the signals M1, M2 and M3 are low. In FIG. 6, the signals M1, M2 and M3 are respectively applied to the output enable terminals of the line memories 180, 182 and 184. If M1 is high, the line memory 180 is enabled to receive data, data is permitted to flow to it and its output channel is blocked so that data cannot be read from it. M2 and M3 are low so as to prevent the line memories 182 and 184 from receiving data. But M2 and M3 do open the output channel of the line memories 182 and 184 so as to permit data to be read from them at the address set by the counters 198 and 200.

It will be noted that the outer radial line is at the left in the left half of a sector and at the right in the right half. In this particular embodiment of the invention, the signal COUNT is always referenced to the outer line so that the data samples from the outer line must be separated from the data samples of the inner line. This function is performed by multiplexers 360 and 362. Different inputs of each multiplexer are respectively connected to the I/O channels of each of the line memories 180, 182 and 184 and are controlled as described below so that the multiplexer 360 directs data samples from the outer radial line to a bus OL and the multiplexer 362 directs data samples from the inner radial line to a bus IL.

The control for the multiplexer 360 is comprised of an inverter 363 connected between a source of the signal M2 and one input of an AND gate 366, an inverter 368 coupled between the output of an XOR 370 and the other input of the AND gate 366, the XOR 370 having the signals SIGN and M1 respectively applied to its input. The output of the XOR 370 is also applied to one input of an AND gate 372, and the signal M3 is applied to the other input of the AND gate 372 via an inverter 374. The output of the AND gate 366 is applied to the LSB, select A, input of the multiplexer 360 and the output of the AND gate 372 is applied to the MSB, select B, input of the multiplexer 360. With these connections, the outer lines will be selected as indicated in the table of FIG. 6A and applied to the outer line bus OL.

The control for the multiplexer 362 is comprised of an inverter 376 connected between a source of the signal M3 and one input of an AND gate 378, an inverter 380 connected between a source of M2 and one input of an AND gate 382, an XOR 383 having one input connected to a source of SIGN and the other input connected to a source of M1, the output of the XOR 383 being connected to an input of the AND gate 382 and also being connected via an inverter 384 to an input of the AND gate 378. The output of the AND gate 378 is connected to the MSB, select B, input of a multiplexer 362 and the output of the AND gate 382 is connected to the LSB, select A, input of the multiplexer 362. With these connections, the inner line will be selected as indicated in FIG. 6B and applied to the inner line bus IL.

As can be seen in FIG. 10, the output lead OL from the multiplexer 360 is connected to the input of a shift register 386 and the output lead IL from the multiplexer 362 is connected to a shift register 388. The $Q_A$ and $Q_B$ outputs of the shift register 386 respectively provide successive data points on the outer line to means to be described for deriving a first intermediate interpolated data value, and the $Q_A$ and $Q_B$ outputs of the shift register 388 respectively provide successive data points on the inner line to means to be described for deriving a second intermediate interpolated data value.

Selection of Data Samples from Line Memories

The signals INCR and DECR provided by the radius counter 294 of FIG. 8 are used to respectively cause the pair of counters 196, 198 and 200, shiown in FIG. 6, that are connected to the line memories being read to advance, stay at the same point or retard. It will be recalled that INCR is high if the radius of a display point becomes greater than that of a data sample, as in stepping from $DP_7$ to $DP_8$ of FIG. 9, and that DECR becomes high if the radius of a display point becomes less than that of a data sample, as in stepping from $DP_6$ to $DP_7$. When the integer portion of the radius remains unchanged, as in stepping from $DP_5$ to $DP_6$, both INCR and DECR remain low so that the counters don't change. As will be explained, the counters cannot change until a signal SHIFT is asserted in a manner to be explained. SHIFT is asserted in response to each high state of INCR and DECR.

At the start of a line, there is a special situation because, as can be seen from FIG. 3, INCR and DECR will both be low until a display point has a radius greater than that of the data samples $S_{11}$ and $S_{11}'$. Therefore, neither INCR or DECR can cause the signal SHIFT required to change the counters associated with the two of the memories of FIG. 6 that are being read. In these circumstances, the counters are controlled as follows.

At the beginning of each line of data received from the scanner 134, a signal STRTL is produced at the output of the latch 172 of FIG. 5 and is used to initiate the scanning of display points as discussed in connection with FIG. 7. The STRTL signal is also applied to the set input of the latch 248 and to a two-stage shift register 392. The register 392 is enabled by NENBL so that it outputs two successive high state pulses STRT1 and STRT2 to separate inputs of an OR gate 396. Essentially, the STRTL gets delayed in the shift register 392 to produce two delayed versions of STRTL for input to OR gate 396. The output of the OR gate 396 is applied to one input of an AND gate 398 and ENABLE is applied to the other, so that coincidence of the two causes the AND gate 398 to output a high level known as SHIFT so that the counters can count.

When sufficient time has elapsed for the signals RERR and $\theta$ERR to be developed for the first two samples of each line of a slice that occur at the same times as STRT1 and STRT2, the first sample of each line being at the origin, a signal STRTI, start interpolating, is sent from the state address decoder 246 of FIG. 7 to the reset input of the latch 248. The latch 248 was set by STRTL and STRTI clears it. The time between STRTL and STRTI is indicated by WAIT. When STRTI occurs, the latch 248 enables a latch 399 to which the signals INCR and DECR from the radius counter 294 of FIG. 8 are applied. After INCR and DECR pass through the latch 399, they become MINCR and MDECR respectively and are applied to separate inputs of the OR gate 396 and produce a signal SHIFT at the output of the AND gate 398 when high. In addition, MDECR is applied to inverter 395 to produce a signal NMDECR.

Controlling the Counters with SHIFT

For the counters 196, 198 and 200 to be able to count, their inputs ENT and ENP must be at a low state. Assume that data examples are being written into the line memory 180 so that M1 is high and M2 and M3 are both low. In explaining the writing function, it was noted that M1 being high would cause the ENP input of the counter 196 for the line memory 180 to be in a low state for an entire line so that its count was advanced each time the signal ADDEN, which is applied to the ENT inputs, occurred. For the counters 198 and 200, NM2 and NM3 are high for an entire line, and since they are applied to the respective ENT inputs via inverters 197 and 199, these inputs are kept in low state during the line.

Signals M2+SHIFT and M3+SHIFT are respectively applied to the ENP inputs of the counters 198 and 200 via the inverters 400 and 402. M2 and M3 are low for the entire line so that they cannot make the ENP inputs low. Thus only SHIFT can cause the counters 198 and 200 to count. The signals M1+SHIFT, M2+SHIFT and M3+SHIFT are respectively derived by applying M1, M2 and M3 to an input of OR gates 408, 410 and 412 and applying SHIFT to their other inputs.

When a line memory 180, 182 or 184 is being read and the corresponding counters 196, 198 and 200 count in response to the signal SHIFT as just explained, the counters respectively count up when signals UND1, UND2 and UND3 are in a high state and count down when UND1, UND2 and UND3 are in a low state. Assume, as was done in considering the writing function, that the display samples are being written into the line memory 180 so that M1 is high and M2 and M3 are low. Assume further that NMDECR is high. Under these conditions, the output UND1 of the OR gate 202 of FIG. 5 is high with the result that the counter 196 for the line memory that is being written into counts up as desired. The output UND2 of the OR gate 204 and the output UND3 of the OR gate 206 are also high so that the counters 198 and 200 are set to count up, but if NMDECR is low, they are set to count down.

As the counters 198 and 200 are counting up and down, the display samples at the corresponding addresses of the line memories 183 and 184 are placed in the $Q_A$ section of the shift registers 386 and 388 of FIG. 10. SHIFT also controls the shift registers 386 and 388 via the following logic circuit of FIG. 10. SHIFT is applied to one input of an AND gate 409 and to one input of an AND gate 411, and MDECR is applied to the other input of the AND gate 411. The output of the AND gate 409 is connected to the shift-left inputs of the shift registers 386 and 388, and the output of the AND gate 411 is connected to their shift-right inputs. When SHIFT goes high and MDECR is low, the AND gate 411 causes the registers to shift the data samples in them to the right and accept the new data samples at the inputs. But if SHIFT goes high and MDECR goes high, the AND gate 409 causes the data samples in the registers 386 and 388 to shift left, i.e., replacing $Q_A$ with $Q_B$, $Q_B$ with $Q_C$, etc. The shift registers 386 and 388 are eight words long providing the capability to back up by six data samples and still leave two words in the registers. SHIFT is asserted twice at the start of each line due to the action of STRT1 and STRT2 present at the input to OR gate 396 of FIG. 5. This action puts the first two data points $S_{10}$, $S_{11}$ of FIG. 3 for the line $R_O$ and $S_{10}'$, $S_{11}'$ for the line $R_I$ into the $Q_B$ and $Q_A$ sections of their respective shift registers 386 and 388. The interpolation can now proceed but no further change in the four data samples occurs until the display point scanning signals YINC/$\overline{XINC}$, XDIR cause a step to a display point that has a radius greater than that of the display point $S_{11}$, $S_{11}'$ at which point the signal INCR becomes high, causing SHIFT to go high and advancing the counters 198 and 200 as well as moving the shift registers to the right so as to apply data samples $S_{11}$ and $S_{12}$ at the outputs $Q_B$ and $Q_A$ of the shift register 386 and data samples $S_{11}'$ and $S_{12}'$ at the outputs $Q_B$ and $Q_A$ of the shift register 388.

Now assume that the display point scanning signal causes a step to a display point that has a radius less than that of $S_{11}$ and $S_{11}'$, i.e., a step back over the current inner radial boundary. The signal DECR will now be high as will MDECR, and remembering that M2 and M3 are low, it is seen that the signals UND2 and UND3 are low so as to set the counters 198 and 200 to count down. SHIFT causes the counters to count down and, in combination with MDECR, causes the shift registers 386 and 388 to shift left, bringing the display points $S_{10}$, $S_{11}$ and $S_{10}'$ $S_{11}'$ back into $Q_B$ and $Q_A$ locations of the registers 386 and 388 respectively. Should the step to the next display point cause a third crossing of the arc line on which $S_{11}$ and $S_{11}'$ are, samples $S_{12}$ and $S_{12}'$ having been lost from the registers causes no problem because the next points from the line memories 182 and 184 are samples $S_{12}$ and $S_{12}'$ since the read address is controlled by SHIFT as previously described.

Interpolation

Refer now to FIG. 10. The data samples at the $Q_A$ and $Q_B$ outputs of the shift register 386 are applied to multiplying ROMs 414 and 416 respectively, the display samples at the $Q_A$ and $Q_B$ outputs of the shift register 388 are applied to multiplying ROMs 418 and 420 respectively, and the signal RERR representing the radial position of the display point is applied to all four ROMs after being latched in 415. The data samples are represented by five-bit numbers, as is the signal RERR which, of course, is a fraction. The ROMs are programmed to perform the appropriate multiplication of $RERR \times Q_A$ value in 416 and 420 and by $(1-RERR) \times Q_B$ data value in 414 and 418. The output of the ROM 414 is passed through latch 414' to one input of an adder 422, and the output of the ROM 416 is passed through a latch 416' to another input of the adder 422 so that its output is the first intermediate interpolated data value. Similarly, the outputs of the ROMs 418 and 420 are passed through latches 418' and 420' respectively to inputs of an adder 424 so that its output is the second intermediate interpolated data value.

The first and second intermediate interpolated data values $I_1$ and $I_2$ are applied via latches 422' and 424' to inputs of multiplying ROMs 426 and 428 respectively. The signal $\theta ERR$ from the output of the latch 354 of FIG. 8 is applied to the multiplying ROMs 426 and 428 after passing through latches 430, 432 and 434 so as to produce at the outputs of the ROMs 426 and 428 the respective contributions of the first and second intermediate interpolated data values to the final data value. ROM 426 performs the multiplication of $1-\theta ERR$ times the output of latch 422', and ROM 428 performs the multiplication of $\theta ERR$ times the output of latch 424'. Latches 426' and 428' are respectively connected between the outputs of the ROMs 426 and 428 and different inputs of an adder 436 so as to produce the final interpolated data value at its output. After passing through latches 438 and 440 and a buffer 441, the final interpolated data value is applied to the x, y addresses in the display memory DM' that are determined by the x and y sector address counters 249 and 252 of FIG. 7, providing the display point is angularly and radially within the slice, a fact indicated by NVALD at the output of the NAND gate 306 of FIG. 8 being high. Memory DM' is scanned by a DM' read control 442 in any desired manner, and the signals supplied to a display 444 so as to form an image free from moirés and other troublesome artifacts that are present in images of other scan conversion systems.

Summary of Operation

The following chart displays the values of the radius, COUNT and XHAT as well as the states of the display point scanning control signals XDIR and YINC/$\overline{XINC}$, and INCR, DECR, XUP/DN, XCNT and YCNT for the display points $DP_5$ through $DP_{14}$ illustrated in FIG. 9 wherein $DP_5$ is the initial display point having initial values radius, COUNT and XHAT of $R_i$, $C_i$ and $XH_i$. Ordinarily, the initial display point is at the origin of the sector at which all these values are zero, but the recursive addition could start from any display points for which the values are respectively known. As previously stated, XDIR=1 indicates a step away from the center of the sector, YINC/$\overline{XINC}$=0 indicates a step along the x axis and YINC/$\overline{XINC}$=1 indicates a step along the y axis away from the origin. INCR and DECR can both be 0 when steps from one display point to another do not cross the radial boundary of a sub-slice, but if either is 1, the step crosses such a boundary. Values of 1 for XCNT and YCNT indicate a step along the respective axis.

As a further aid in understanding the operations of the preferred embodiment of FIGS. 5, 6, 7, 8 and 10, FIGS. 11 and 12 are presented to show the timing of various signals to be used. The points in the circuit where these signals appear are indicated by corresponding encircled letters.

| DP | Radius | COUNT | XHAT | x | y | XDIR | YINC/$\overline{XINC}$ | INCR | DECR | XUP/DN | XCNT | YCNT |
|---|---|---|---|---|---|---|---|---|---|---|---|---|
| 5 | $R_i$ | $C_i$ | $XH_i$ | $x_i$ | $y_i$ | 0 | 0 | 0 | 0 | 1 | 1 | 0 |
| 6 | $R_i - \sin\theta_2$ | $C_i + 1$ | $XH_i$ | $x_i+1$ | $y_i$ | 0 | 0 | 0 | 0 | 1 | 1 | 0 |
| 7 | $R_i - 2\sin\theta_2$ | $C_i + 2$ | $XH_i$ | $x_i+2$ | $y_i$ | 0 | 1 | 0 | 1 | 1 | 0 | 1 |
| 8 | $R_i - 2\sin\theta_2 + \cos\theta_2$ | $C_i + 2 + \tan\theta_2$ | $XH_i + \Delta XHAT$ | $x_i+2$ | $y_i+1$ | 1 | 0 | 1 | 0 | 0 | 1 | 0 |
| 9 | $R_i - \sin\theta_2 + \cos\theta_2$ | $C_i + 1 + \tan\theta_2$ | $XH_i + \Delta XHAT$ | $x_i+1$ | $Y_i+1$ | 1 | 0 | 1 | 0 | 0 | 1 | 0 |
| 10 | $R_i + \cos\theta_2$ | $C_i + \tan\theta_2$ | $XH_i + \Delta XHAT$ | $x_i$ | $y_i+1$ | 1 | 0 | 0 | 0 | 0 | 1 | 0 |
| 11 | $R_i + \sin\theta_2 + \cos\theta_2$ | $C_i - 1 + \tan\theta_2$ COUNT is neg. | $XH_i + \Delta XHAT$ | $x_i-1$ | $y_i+1$ | 1 | 1 | 0 | 0 | 0 | 0 | 1 |
| 12 | $R_i + \sin\theta_2 + 2\cos\theta_2$ | $C_i - 1 + 2\tan\theta_2$ | $XH_i + 2\Delta XHAT$ | $x_i-1$ | $y_i+2$ | 0 | 0 | 1 | 0 | 1 | 1 | 0 |
| 13 | $R_i + 2\cos\theta_2$ | $C_i + 2\tan\theta_2$ | $XH_i + 2\Delta XHAT$ | $x_i$ | $y_i+2$ | 0 | 0 | 0 | 0 | 1 | 1 | 0 |
| 14 | $R_i - \sin\theta_2 + 2\cos\theta_2$ | $C_i + 1 + 2\tan\theta_2$ | $XH_i + 2\Delta XHAT$ | $x_i+1$ | $y_i+2$ | 0 | 1 | 0 | 0 | 0 | 0 | 1 |

Alternative Embodiments and Methods of Operation

In order to increase the resolution of a portion of the image such as the center, the radial lines of the scanner may be made closer together in that portion. The scan conversion system of the invention could accommodate such a format by changing the 1's and 0's in the memory of the state machine of FIG. 7 so as to provide scanning control signals for selecting appropriate display points and by changing the stored values of the various trigonometric functions.

At the present time, the sampling rate of A/D converters is such as to make it desirable to interpolate along the radial direction, but the advance in the solid state art is such that much higher sampling rates can be expected so that this interpolation may not be required. In such event, it would still be necessary to determine INCR and DECR so that proper display samples, one from each radial line, could be selected; and it would still be necessary to make the angular interpolation. The systems described would operate in this fashion if the signal RERR is set equal to zero.

FIG. 13 illustrates a modification of the system wherein the ROMs 414 and 416 of FIG. 10 are replaced by a ROM 446, the ROMs 418 and 420 are replaced by a ROM 448, and the ROMs 426 and 428 are replaced by a ROM 450. The latches have been omitted in the interest of clarity. The ROMs 446, 448 and 450 are identical. Each contains a different stored output for all combinations of the error signal, whether it is RERR or $\theta$ERR, and the possible values of the data samples. As shown, the signal RERR is applied to the ROMs 446 and 448 and the signal $\theta$ERR is applied to the ROM 450 so that the first intermediate interpolated data values $I_1$ and $I_2$ are derived at the radial position of each display point, and the final interpolated data value FDP is derived at the angular position of the display point. In this case, the data samples $S_1$ and $S_2$ would be those along one radial line of a slice, and the data samples $S_3$ and $S_4$ would be along the other radial line. As previously described, however, the signal $\theta$ERR could be applied to the ROMs 446 and 448 and the signal RERR could be applied to the ROM 450 so that the first and second intermediate interpolated data values $I_1'$ and $I_2'$ are at the angular position of the display point. In this case, $S_1$ and $S_2$ would be along a radial arc, and $S_3$ and $S_4$ would be along another radial arc.

FIG. 14 illustrates a single solid state device 452 that performs internally all of the functions of the three devices 446, 448 and 450 of FIG. 13.

FIG. 15 illustrates an embodiment of the invention wherein the signals RERR and $\theta$ERR are not actively derived as the display points of a slice are being scanned because the values of RERR and $\theta$ERR for each display point have been previously determined and stored in a ROM 454. The display point scanning control signals XDIR and YINC/XINC are provided by means 456, and the x,y address of each display point is determined by counters 458 and 460 in a manner previously explained. The signal STRTL is applied to the ROM 454 and, in order to reduce the number of pins required, the word representing the first line of a sector could be used by means 462 to produce a signal at the beginning of each sector scan so as to achieve synchronization. From the x,y address of a display point, the ROM 454 selects the appropriate stored values of INCR and DECR that are used as explained in the discussion of FIGS. 5, 6, 8 and 10 to select the correct data samples $S_1$, $S_2$, $S_3$ and $S_4$ from the line memories. Stored in the ROM 454 are the final data values for all possible combinations of RERR, $\theta$ERR for each display point and DATA. The appropriate final data value is selected from the digital values of RERR, $\theta$ERR and DATA for each point. Thus, the ROM 454 is a means responsive to the data sample and the display point scanning control signals for determining the final interpolated data value for each display point.

The scan conversion system of this invention lends itself to enlarging a selected portion of the image that lies between any two radial lines and within a given radial range. As will be explained in a continuing patent application, this can be done by providing means that may include a cursor for identifying the radial lines and the radial range, means for dividing RERR for each display point in the smaller portion of the image by a magnification factor m, and means for multiplying XHAT and COUNT for each display point in the smaller portion by m. It would also be possible to scan the smaller portion of the image more rapidly in order to attain clearer images of rapidly moving objects.

Instead of using a single radial position, one could calculate two radial positions in the following manner. Two constants called $\Delta R_2$ and $\Delta R_1$ would be selected for every line within the sector. $\Delta R_2$ would feed one accumulator and $\Delta R_1$ a second accumulator. The two accumulators would be updated every time a movement in y is indicated by the display point scanning signal. The first accumulator would use $\theta_2$ in calculating the radius corresponding to the distance from the sector apex along the outer line to the intersection of the row where the current display point DP resides. The second accumulator would use $\theta_1$ in calculating the radius corresponding to the distance from the sector apex along the inner line to the intersection of the same row as described above. Each radius counter would produce their own signals INCR and DECR to respectively move the two shift registers appropriately such that the data present at the $Q_A$ and $Q_B$ outputs from each shift register bounded their respective radius calculation. The two radius calculations in turn would generate two RERR signals called RERR"$_o$ for the outer line and RERR"$_i$ for the inner line. These signals would be used to interpolate the data present at each shift register. The end result of the above would be two intermediate interpolated data values, each bounded by two sample data values that do not necessarily have the same radial displacement from the apex. The intermediate interpolated data values would be at the intersection of the current output display row and the two scan lines currently being read out from the line memories.

These two intermediate data values would then be used in a manner analogous to the present way of correcting for $\theta$ERR mainly using the signals COUNT and XHAT. The end result would be a final data value derived by using COUNT and XHAT to interpolate intermediate interpolated data alues at the intersection of the current row of display points with the radial lines of a slice.

As will be described in a continuing application, expansion of a selected area can be effected by multiplying $\theta$ERR for each display point in the area by a magnification factor m and dividing RERR by m.

There are a number of ways of utilizing ROMs to obtain a final interpolated data value from data samples defining an area containing a display point. In FIG. 16, for example, a data scanner 464 provides data samples along successive radial lines as well as a L# signal and signals at the start of each line to a memory device 466 that stores the data samples from all the radial lines of a sector. A display point scanner 468 provides the x,y addresses of the display points in any desired sequence to a ROM 470 so as to address information programmed therein for each display point. The information includes $\theta$ERR, RERR, NVALD, the L# of $R_O$ or $R_I$ and the number of one of the data samples such as $S_1$ in FIG. 16A that is used in deriving interpolated data values and which has a predetermined position with respect to the other data samples that are to be used in the interpolation. The L# and data sample number are supplied to the ROM 470 and the line memory device 466 which is provided with an address system such that the receipt of a L# and data sample number causes it to output the data sample identified, such as $S_1$, and the other data samples used in the interpolation, such as $S_2$, $S_3$ and $S_4$, to an interpolation ROM 472. $\theta$ERR and RERR are supplied to the ROM 472 from the ROM 470. The ROM 472 has programmed therein all of the possible final interpolated data values for any combination of values of $\theta$ERR, RERR and $S_1$, $S_2$, $S_3$, and $S_4$ and outputs the one selected as the final interpolated data value. It will be noted that the intermediate interpolated data values previously referred to may never actually appear in the ROM 472, but such values that are on substantially the same straight line as the display point will be used in determining the final interpolated data value.

FIG. 17 illustrates a scan conversion system using ROMs in a different way. A data scanner 474 supplies data samples to a three-radial-line buffer 476 that are stored at successive addresses by an up counter 478 that is synchronized by line start signals from the scanner 474. The x,y address of any display points in any desired sequence is supplied from a display point scanner 480 to a ROM 482 that supplies the stored values of $\theta$ERR and RERR for the display point to an interpolation ROM 484. The ROM 482 also supplies signals INCR and DECR to an up-down counter 486 so as to cause the three-line buffer 476 to output data samples for an outer radial line to a shift register 488 and data samples for an inner radial line to a shift register 490. Application of INCR and DECR to the shift register 488 causes it to select data samples such as $S_1$ and $S_3$ of FIG. 16A and transfer them to the interpolation ROM 484; and application of INCR and DECR to the shift register 490 causes it to select data samples such as $S_2$ and $S_4$ of FIG. 16A and transfer them to the interpolation ROM 484. The ROM 484 is programmed with final interpolated data values for all combinations of $\theta$ERR, RERR and values of $S_1$, $S_2$, $S_3$ and $S_4$.

In all of the embodiments of the invention thus far described, the signals that control the sequence in which the display points are scanned are derived first and the respective data samples from which final interpolated data values for the display points are to be derived are selected in response to the scanning signals, but one skilled in the art can readily appreciate that the data samples could be selected first and the display points for which final interpolated data values are to be derived could be selected in response to the data samples. It is only necessary that the data samples and the display points have a relationship such that the data samples to be used in deriving the final interpolated data value for a display point define an area containing that display point.

One way of accomplishing this is illustrated in FIG. 18 wherein the components of FIG. 4 are designated in the same way. Initialization ROMs 492, 494 and 496 are respectively programmed with values of R, XHAT and COUNT for the first display point of each L# beyond the maximum radius supplied to the magnitude compare circuit. The outputs of the ROMs are respectively connected to one set of inputs of multiplexers 498, 500 and 502; and the outputs of the adders 60, 90 and 98 are respectively connected to the other set of inputs of the multiplexers. The outputs of the multiplexers 498, 500 and 502 are respectively connected to the inputs of the latches 62, 92 and 100; and the outputs of the latches are respectively connected to inputs of the adders 60, 90 and 98 so as to form accumulators having outputs R, XHAT and COUNT. The signal STRTL from the source 42 of FIG. 4 is applied to the switching inputs of the multiplexers 498, 500 and 502 as well as to one input of an OR gate 64' and to an input of an OR gate 504. The signals XCNT and YCNT from the devices 46 and 50 of FIG. 4 are respectively applied to the other input of the OR gate 64', and YCNT is applied to the other input of the OR gate 504. Its output is connected to the enable input of the latch 92. The signal L# from the line identification means 36 of FIG. 4 is applied to the ROMs 492, 494 and 496 so as to respectively cause them to output the values of R, XHAT and COUNT for the first display point of each line mentioned above. At the beginning of each radial line, STRTL causes the multiplexers 498, 500 and 502 to respectively connect the outputs of the ROMs 492, 494 and 496, the OR gate 64' to enable the latches 62 and 100 and the OR gate 504 to enable the latch 92. Thus, the initial values of R, XHAT and COUNT are respectively at the outputs of the latches 62, 92 and 100. During the time when data samples are being received from a radial line, XCNT and YCNT from the counters 46 and 50 of FIG. 4 cause the OR gate 64' to enable the latches 62 and 100 so that they respectively output the values of R and COUNT for each display point in the scan, and YCNT causes the OR gate 504 to enable the latch 92 so that it outputs the value of XHAT for each display point of the scan.

Because the scan of display points starts at one that is just beyond the maximum radius and proceeds inwardly toward the origin, it is apparent that the order of presentation of data samples to the interpolator 116 must be reversed. One way of doing this can be better understood by reference to FIG. 6 in which the counters 196, 198 and 200 respectively control the addresses of the line memories 180, 182 and 184. As previously described, all of these counters are cleared (loaded) to zero by the signal NLD at the start of each line. Instead of doing this, only the counter for the line memory receiving data samples is loaded to zero and the other two are loaded with the address of the last data sample. This is effected by respectively creating other "1's" of a load word for the outermost address for the counters 196, 198 and 200 with NM1, NM2 and NM3 respectively. For the counter which is associated with the writing function, the load word will be all zeros so that the first address is at the beginning of a line as required, but the other two counters will start at the outer ends of the line. For these counters, the outermost data samples are therefore at the shift registers 386 and 388 of FIG. 10. When the display point scan first crosses the maximum radius, the signal DECR of FIG. 8 will cause the counters for the line memories being read from to drop to the next lower address so that the two outermost data samples and the ones next closer to the origin are at the outputs of the shift registers 386 and 388. STRT1 and STRT2 of FIG. 5 are no longer necessary and are disabled, and a "1" for YCNT from the address counter control 222 now signifies a step along a column toward the origin so that it must be made to decrement the sector y address counter 252.

The ROMs 286, 330 and 336 now must be programmed so as to respond to YINC in such a manner as to provide a negative value to the adders 290, 332 and 340 in their respective accumulators. This is due to the fact that the hardware now assumes any step in y is a step towards the origin, thereby decreasing R, COUNT and XHAT.

What is claimed is:

1. Apparatus for deriving interpolated values from data samples occurring at the intersections of a set of radial lines forming a sector with a set of equally spaced radial arc lines having the same center as said radial lines, the interpolated values to be displayed at display points arranged in orthogonal rows and columns that are respectively parallel to x and y axes, there being a separation $K_x$ between said columns and a separation $K_y$ between said rows, comprising means for making simultaneously available at least four data samples at the intersection of two radial lines with two radial arc lines, the said four data samples defining a subslice, means for providing first signals representing the radial position of a selected display point with respect to said radial arc lines of the sub-slice, means for providing second signals representing the angular position of said selected display point with respect to the two radial lines of said sub-slice, means responsive to a selected one of said first and second signals for deriving at least one intermediate interpolated data value at one of said radial and angular positions from display samples on one side of said display point, means responsive to the selected one of said first and second signals for deriving at least another intermediate interpolated data value at the said one of said radial and angular positions from data samples on the other side of the display point, and means responsive to the other of said first and second signals and to said intermediate interpolated data values for deriving a final interpolated data value for said selected display point at the other of said radial and angular positions.

2. Apparatus as set forth in claim 1 wherein said means for deriving said at least one intermediate interpolated data value is responsive to said first signals representing the radial position of said display point and to available data samples along at least one radial line on one side of said selected display point, said means for deriving at least another interpolated data value is responsive to said first signals representing the radial position of said display point and to available data samples along at least one radial line on the other side of said selected display point, and said means for deriving a final interpolated data value is responsive to said second signals which represent the angular position of said display point.

3. Apparatus as set forth in claim 1 wherein said means for deriving said at least one intermediate interpolated data value is responsive to said second signals representing the angular position of said selected display point and to available data samples along at least one radial arc line on one side of said display point, said means for deriving at least another interpolated data value is responsive to said second signals representing the angular position of said selected display point and to available data samples along at least one radial arc line on the other side of said display point, and said means for deriving a final interpolated data value is responsive to said first signals which represent the radial position of said display point.

4. Apparatus as set forth in claim 1 wherein said means for providing said first signals representing the radial position of a display point is comprised of means for providing scanning control signals indicating steps from one display point to the next along the x or y axes that result in scanning from a given display point to a selected display point, and an accumulator responsive to said scanning control signals for adding to the known radius of a given display point the net of the following values resulting from steps taken in scanning from said given display point to said selected display point; $+K_x|\sin\theta|$ for each step along the x axis farther from the center of the sector, $-K_x|\sin\theta|$ for each step along the x axis closer to the center of the sector, and $+K_y|\cos\theta|$ for each step along the y axis farther from the center of the sector, the angle $\theta$ being an angle between the center line of the sector and a radial line close to the center of said two radial lines.

5. Apparatus as set forth in claim 5 wherein said means for providing said second signals representing angular position of a display point is comprised of means providing a signal $\Delta$XHAT representing the value $|\tan\theta_2 - \tan\theta_1|$, wherein $\theta_2$ is the angle between the central radial line of said sector and the outer one of said at least two radial lines, and $\theta_1$ is the angle between the central radial line of said sector and the inner one of said at least two radial lines, an accumulator responsive to said scanning control signals for adding to a known distance, XHAT, between the outer and inner radial lines measured along the x axis and passing through a given display point, a value of $+\Delta$XHAT for each step taken along the y axis farther from the origin of the sector in scanning from said given display point to said selected display point, the final sum in the accumulator being the value XHAT for the selected display point, means providing the value of $\tan\theta_2$, an accumultor responsive to said scanning control signals for adding to a known distance, COUNT, of a given display point from the outer radial line as measured along the x axis the net of the following values resulting from the steps taken in scanning from the latter given display point to the selected display point; $+K_x$ for each step along the x axis closer to the central radial line of the sector, $-K_x$ for each step along the x axis farther from the central radial line of the sector, and $+K_y \tan\theta_2$ for each step along the y axis that is farther from the origin of the sector, the final sum in said latter accumulator being the value of COUNT for the selected display point, the values of XHAT and COUNT for the selected display point defining the angular position of the selected display point between the outer and inner radial lines.

6. Apparatus for deriving a signal representing the distance from a given display point to a selected display point in a field of display points disposed in orthogonal rows and columns, the rows being parallel to an x axis and being separated by a value $K_y$, the columns being parallel to a y axis and being separated by a value $K_x$, comprising means for providing scanning signals indicating display point to display point steps in the $+x$ and $-x$ directions as well as in a $+y$ direction that are to be made in moving from the given display point to a selected display point for which the distance is sought, accumulator means responsive to said scanning signals for successively adding the value of $K_x \sin \theta$ for each move from one display point to the next in the $+x$ direction, a value of $-K_x \sin \theta$ for each move from one display point to the next in the $-x$ direction, and a value of $+K_y \cos \theta$ for each move from one display point to the next in the $+y$ direction, $\theta$ being the angle between the y axis and a radial line passing through the origin of the x and y axes and close to the selected display point, the output of the accumulator being the desired signal.

7. Apparatus for deriving the angular position of a selected display point in a field of display points with respect to outer and inner radial lines of a sector passing through said field, said field of display points being disposed in orthogonal rows and columns, the rows being parallel to an x axis and being separated by a value $K_y$, the columns being parallel to a y axis and being separated by a value $K_x$, the outer radial line forming an angle $\theta_2$ with the y axis that is greater than the angle $\theta_1$ formed between the inner radial line and the y axis, comprising means for providing scanning control signals that indicate movements from one display point to the next in $+x$, $-x$ and $+y$ directions that are made in moving from a given display point, the said given display point having a known angular position with respect to the outer and inner radial lines, to the selected display point, means for providing a signal $\Delta$XHAT representing the value of $|\tan \theta_2 - \tan \theta_1|$, an accumulator responsive to said scanning control signals for successively adding a value of $\Delta$XHAT to a known value of XHAT for said given display point, XHAT being the distance between said radial lines measured along the row including the given display point, means providing the value of $\tan \theta_2$, an accumulator responsive to said scanning control signals for adding to a known distance, COUNT, of a given display point from the outer radial line as measured along the x axis the net of the following values resulting from the steps taken in scanning from the given display point to the selected display point; $+K_x$ for each step along the x axis closer to the center radial line of the sector, $-k_x$ for each step along the x axis farther from the center radial line of the sector, and $+K_y \tan \theta_2$ for each step along the y axis that is farther from the origin of the radial lines, the final sum in said latter accumulator being the value of COUNT for the selected display point, the values of XHAT and COUNT for the selected display point defining the angular position of the selected display point between the outer and inner radial lines.

8. Apparatus for deriving the angular position of a selected display point in a field of display points with respect to two radial lines of a sector passing through said field, said field of display points being disposed in orthogonal rows and columns, the rows being parallel to an x axis and being separated by a value $K_y$, the columns being parallel to a y axis and being separated by a value $K_x$, comprising means for providing scanning control signals indicating steps from one display point to the next along the x and y axes that result in scanning from a given display point to the selected display point, means for providing a signal $\Delta$XHAT representing the value of $|\tan \theta_2 - \tan \theta_1|$, where $\theta_2$ is the angle between the y axis and one radial line and $\theta_1$ is the angle between the y axis and the other radial line, an accumulator responsive to said scanning control signals for deriving the sum of a known distance, XHAT, between the two radial lines measured along the x axis and passing through a given display point and the net of the following values resulting from the steps taken in scanning from said given display point to said selected display point; $+\Delta$XHAT for each step taken along the y axis farther from the center of the sector, $-\Delta$XHAT for each step taken along the y axis closer to the center of the sector, the final sum in the accumulator being the value of XHAT for the selected display point, means for providing values of $K_y \tan \theta_2$, an accumulator responsive to said scanning control signals for deriving the sum of a known distance, COUNT, between one of said two radial lines and said given display point as measured along the x axis the net of the value $+K_x$ for each step along the x axis in one direction, $-k_x$ for each step along the x axis in the opposite direction, $+K_y \tan \theta_2$ for each step along the y axis in one direction and $-K_y \tan \theta_2$ for each step along the y axis in the opposite direction as the step-by-step scanning proceeds from said given display point to said selected display point, the sum in said latter accumulator at that time being the value of COUNT for the selected display point, the values of XHAT and COUNT for the selected display point defining the angular position of the selected display point between the two radial lines.

9. A scan conversion system for translating analog data obtained by successively scanning along radial lines at a given line scanning rate to an addressable display memory having display points disposed in orthogonal rows and columns, the rows being parallel to an x axis and having a separation of $K_y$ and the columns being parallel to a y axis and having a separation of $K_x$, comprising an analog-to-digital converter coupled to said source for providing digitized data samples derived at uniformly spaced points along each radial line having like distances respectively from the origin of the radial lines, first, second and third line data memories, each capable of storing the digital samples from the scansion of a single line, means for coupling said source of data samples to said first, second and third digital memories in repeated sequence, the change in coupling occuring at said line scanning rate, means for addressing said digital memories to select the x,y coordinate of display points therein that are to coincide with the origin of the radial lines, a source of display point scanning control signals indicating at a given rate the display point to display point steps that are to be taken along the +x, −x and +y directions to scan from the diplay point at the origin of the radial lines through all the display points in a slice between a pair of radial lines, means for causing said source to start outputting the control signals for the next slice at each line start, means coupled to said source of scanning control signals for incrementing the x address of the display memory each time the scanning control signal indicates a step in the +x direction, decrementing the x address of the display memory each time the scanning control signal indicates a step in the −x direction, and incrementing the y address of the display memory each time the scanning control signals indicate a step in the +y direction, a first memory having stored therein the values of +Sin, −Sin and +Cos for the angles between each of said radial lines and the central radial line of the sector, means responsive to the start of the scanning of each line for making the corresponding +Sin, −Sin and +Cos values stored in said first memory available at respectively different outputs throughout the scanning of the line, a first accumulator coupled to said latter means, means responsive to said display point scanning control signals for causing the value of −Sin to be applied to said accumulator for each step along the x axis toward the center line of the sector, the value of +Sin to be applied to said accumulator for each step in the x axis away from the central line of the sector and the value of +Cos for each step along the y axis away from the origin of the sector, the sum in said accumulator being the radial distance of the current display point from the origin, data selection control means responsive to the output of said accumulator for producing a signal INCR whenever the radial distance increases through the radial distance of a data sample point and for producing a signal DECR whenever the radial distance decreases through the radial distance of a data sample point, radial error detection means responsive to the output of said accumulator for deriving a signal RERR representing the fraction of the spacing between data samples that a display point is beyond the inner sample, a second memory having stored therein the value of $\Delta$XHAT, tan $\theta_2$ − tan $\theta_1$, for the outer and inner lines of each slice respectively, a second accumulator coupled to said second memory, means responsive to said display point scanning control signals for applying to said second accumulator the value $\Delta$XHAT for each step along the y axis away from the origin, a third memory having stored therein +$K_x$, −$K_x$ and tan $\theta$, for the angle between the center line of the sector and each radial line of a slice, a third accumulator, means for selecting the tangent $\theta$ for the outer radial line, means responsive to the display point scanning control signals for causing the value +$K_x$ to be applied to said third accumulator for each step in the +x direction, the value of −$K_x$ to be applied to said third accumulator for each step in the −x direction, and the value of the selected tangent $\theta$ to be applied to said third accumulator for each step in the +y direction thereby making the sum at the output of said third accumulator be a signal COUNT representing the distance of a display point from the outer radial line, data sample selection means for separately obtaining from each of said line memories not coupled to said source of data signals a pair of inner and outer data samples, means for causing said data sample selection means to advance by one data sample in each line memory whenever said data selection control means outputs a signal INCR so that the inner data samples are the previous outer data samples and for causing said data selection means to retreat by one data sample in each line memory whenever said data selection control means outputs a signal DECR so that the outer data samples are the previous inner data samples, means responsive to the data samples obtained by said data sample selection means from one of said line memories and to the signal RERR provided by said radial error detection means for deriving an intermediate interpolated data value at the radial position of each display point indicated by the display point scanning control signals, means responsive to the data samples obtained by said data sample selection means from the other of said line memories and to the signal RERR provided by said radial detection means for deriving another intermediate interpolated data value at the radial position of each display point indicated by the display point scanning control signals, and means responsive to said intermediate interpolated data values for each indicated display point and to the values of the signals COUNT and XHAT for each display point for deriving a final interpolated data value at the angular position of the display point.

10. A scan conversion system for translating analog data obtained from a scanner that scans along radial lines of a sector in sequence and at a given rate for application to a display memory having display points effectively disposed in orthogonal rows parallel to an x axis and columns parallel to a y axis, the rows being separated by $K_y$ and the columns being separated by $K_x$, comprising sampling apparatus for providing samples of the analog data occurring at sample points along said radial lines that are equally spaced from each other and have the same respective radial distances from the origin of the sector, memory means coupled to the output of said sampling apparatus, a source of display point scanning control signals for indicating the sequence of display point to display point steps of $K_x$ along the x axis or steps of $K_y$ along the y axis in order to scan the display points between the radial lines forming each slice of the sector, means coupled to said source of display point scanning control signals for updating the x and y addresses of said display memory as the display points are scanned, means for deriving the radial position of a display point of a slice comprising an accumulator responsive to said display point scanning signals for deriving the sum of the radius of a given display point and $+K_x \sin\theta$, $-K_x \sin\theta$ and $K_y \cos\theta$ for scanning steps from said given display point that are respectively along the x axis and farther from the origin of the sector, along the x axis and closer to the origin, and along the y axis and farther from the origin, the angle $\theta$ being between the y axis and a radial line close to the center of the slice, means responsive to an increase in the output of said accumulator beyond a radius of any sample point to produce a signal INCR and to each decrease in said output below a radius of any sample point to produce a signal DECR, means providing a signal representing $\Delta$XHAT equal to the absolute value of the difference between the tangents of the angles between the respective radial lines defining a slice and the y axis, means for deriving a signal XHAT for each display point of a slice, XHAT being equal to the distance along the x axis between the radial lines defining the slice and passing through the display point, said means comprising an accumulator responsive to the display point scanning control signal for adding to the known value of XHAT for a previously scanned display point a value of $\Delta$XHAT for each step of $K_y$ in scanning from that display point to the display point for which the value of the signal XHAT is sought, means for providing the value $K_y \tan\theta$ where $\theta$ is the angle between one radial line of a slice and the y axis, means responsive to said display point scanning signals for deriving a signal COUNT, which is the distance along the x axis of a display point from one of the radial lines of a slice, by combining values of $K_x$ for steps along the x axis and values of $K_y \tan\theta$ for steps along the y axis, data sample selection means for obtaining from said memory data samples from the radial lines of a slice having the same radius, said radius being less than that of a display point for which the signals RERR, COUNT and XHAT are available and two data samples from the same radial lines having the same radius, said radius being greater than that of the display point;

first interpolating means responsive to the signal RERR and to the data samples on one radial line of a slice for deriving a first intermediate interpolated data value at a radial distance along said radial line equal to that of said display point, second interpolating means responsive to the signal RERR and to the data samples on the other radial line of the slice for deriving a second intermediate interpolated data value at the radial distance along the radial lines equal to that of said display point, third interpolating means responsive to the signals COUNT and XHAT and to said first and second intermediate interpolated data values a final interpolated data value for said display point at the angular position of said display point between the radial lines of the slice, and means for causing said data sample selection means to advance by one data sample in response to a signal INCR and to retreat by one data sample in response to a signal DECR.

11. A scan conversion system as set forth in claim 10 wherein said first interpolating means is responsive to the signals COUNT, XHAT and the data samples of less radius than the display point for deriving a first intermediate interpolated data value at the angular position of said display point between the radial lines of the slice, said second interpolating means is responsive to the signals COUNT, XHAT and the data samples of greater radius than the display point for deriving a second intermediate interpolated data value at the angular position of said display point between the radial lines of the slice, and said third interpolating means is responsive to the signal RERR and to the first and second intermediate interpolated data values for deriving a final interpolated data value for said display point at the radial position of said display point.

12. A scan conversion system for translating analog data obtained from a scanner that scans along radial lines of a sector in sequence and at a given rate for application to a display memory having display points effectively disposed in orthogonal rows parallel to an x axis and columns parallel to a y axis, the rows being separated by $K_y$ and the columns being separated by $K_x$, comprising sampling apparatus for providing samples of the analog data occurring at sample points along said radial lines, said sample points being equally spaced from each other and having the same respective radial distances from the origin of the sector, memory means coupled to the output of said sampling apparatus, a source of display point scanning control signals for indicating the sequence of display point to display point steps $K_x$ along the x axis or $K_y$ along the y axis in order to scan the display points for each slice of the sector, means coupled to said source of display point scanning control signals for updating the x and y addresses of the display memory, means providing a signal representing $\Delta$XHAT equal to the absolute value of the difference between the tangents of the angles between the respective radial lines defining a slice and the y axis, means for deriving a signal XHAT for each display point of a slice, XHAT being equal to the distance along the x axis between the radial lines defining the slice and passing through the display point, said means comprising an accumulator responsive to the display point scanning control signal for adding to the known value of XHAT for a previously scanned display point a value of $\Delta$XHAT for each step of $K_y$ in scanning from that previously scanned display point to the display point for which the value of the signal XHAT is sought, means for providing the value $K_y \tan\theta$ where $\theta$ is the angle between one radial line of ech slice and the y axis, means responsive to said display point scanning signals for deriving a signal COUNT which is the distance along the x axis of a display point from one of the radial lines of a slice, by combining values of $K_x$ for steps along the x axis and values of $K_y \tan \theta$ for steps along the y axis, means for obtaining from said memory a data sample on each of two radial lines, said samples having the same radius, and interpolating means responsive to the signals COUNT, XHAT and said data samples for deriving an interpolated data value for said display point at the angular position of said display point between the radial lines of the sector.

13. Apparatus for translating data samples at equally and uniformly spaced points along radial lines of a sector to display points of a display memory that are effectively arranged in rows separated by $K_y$ and columns separated by $K_x$, one of said columns coinciding with a radial line of said sector, comprising means for generating display point scanning control signals representing the step-by-step scanning along the rows and columns of display points for a slice between successive radial lines, means for storing the values of $+K_x \sin \theta$ and $-K_x \sin \theta$, said $\theta$ having values equal to the angles between a column of display points and a radial line near the center of each slice, means responsive to said scanning control signals for each slice for recursively adding values of $+K_x \sin \theta$ and $-K_x \sin \theta$ for that slice to the known radius of a given display point occurring earlier in the scan so as to derive the value of the radius for each display point, means for deriving the fractional part of the radius for each display point which derives a signal RERR for that point, means for storing values of $\Delta$XHAT for each slice, means responsive to said scanning control signals for each slice for recursively adding for each step along a column a value $\Delta$XHAT for that slice to the known value of XHAT for a display point occurring earlier in the scan so as to derive the value of XHAT for each display point, means for storing the values of $+K_x$, $-K_x$ and $K_y \tan \theta'$ where the values of $\theta'$ are the respective angles between said column and one of the radial lines of each slice, means responsive to said scanning control signals for recursively adding at each step in the scan one of the values stored by said latter means to a known value of COUNT for display points occurring earlier in the scan so as to derive the value of COUNT for each display point, means for dividing the signal COUNT for each display point by the signal XHAT for that point so as to derive a signal $\theta$ERR for that display point, means for selecting data samples located at the intersection of radial arcs with the radial lines of a slice, first interpolating means responsive to a pair of said selected data samples and to one of said signals RERR and $\theta$ERR for each display point for deriving a first intermediate interpolated data value for that display point, second interpolating means responsive to another but similar pair of said selected data samples and to said one of the signals RERR and $\theta$ERR for each display point for deriving a second intermediate interpolated data value for that display point, and means responsive to said first and second intermediate interpolated data values for each display point and to the other of said signals RERR and $\theta$ERR for each display point for deriving a final interpolated data value for each display point.

14. In a display system wherein the image represented by data samples occurring at equally spaced points along radial lines emanating from the origin of a sector is reproduced by a field of display points arranged in orthogonal rows and columns, the rows being separated by a distance $K_y$ and the columns being separated by a distance $K_x$, apparatus for deriving signals respectively representing the radial distances of display points lying in a slice defined by a pair of radial lines of the sector, the origin of the sector being at a given location in the field of display points, comprising means for providing a first signal representing the radial distance of a given display point from said location, means for providing display point scanning signals indicating the steps from one display point to the next along a row or column of display points in scanning from said given display point along a path including display points in the slice, means responsive to said display point scanning signals for updating said first signal by adding signals representing functions of the following values as the display point scanning proceeds along the path: $+K_x \sin \theta$ for each step along a row in a direction away from the sector origin; $-K_x \sin \theta$ for each step along a row in the opposite direction; $+K_y \cos \theta$ for each step along a column away from the sector origin; and $-K_y \cos \theta$ for each step along a column in a direction opposite to said latter direction, the angle $\theta$ being the acute angle between a column and a given radial line passing through the origin and near the angular center of said slice, said updated first signal representing the radial distance of each display point from the origin of the sector when the display point scan reaches it.

15. Apparatus as set forth in claim 14 for deriving an interpolated data value at each display point within the slice, comprising means for providing a second signal representing the distance between the radial lines defining a slice as measured along a given row of display points, means for providing a third signal representing the change in the distance between the radial lines defining a slice that results from a step in the display point scan from one row of display points to the next, means responsive to said display point scanning signals for updating the second signal by the addition of a positive value of said third signal for each step along a column in a direction away from the origin of the sector or by a negative value of said third signal for each step along a column toward the origin of the sector, means for providing a fourth signal representing the distance between a given display point and one of the radial lines defining a slice as measured along a row of display points, means responsive to said display point scanning signals for updating said fourth signal by the addition of: $+K_x$ for each step along a row in a direction that if made from a display point in a slice would be away from said one of the radial lines defining the slice and toward the other; $-K_x$ for each step along a row in the opposite direction; $+K_y \tan \theta'$ for each step along a column in a direction that if made from a display point in the slice would be away from the said one radial line and toward the other; and $-K_y \tan \theta'$ for each step in a direction opposite to said latter direction, $\theta'$ being the acute angle between said one radial line and a column, means responsive to said display point scanning signals and to said updated first signal for making available, as the scan reaches each display point, a first pair of data samples, said first pair of data samples each having a radius less than the radius of the display point, and a second pair of data samples each having a radius greater than the radius of said display point, means responsive to said updated second and updated fourth signals and to said first pair of data samples for deriving a first intermediate interpolated data value, means responsive to said updated second and updated fourth signals and to said second pair of data samples for deriving a second intermediate interpolated data value, and means responsive to said first and second intermediate interpolated data values and said updated first signal representing the radial distance of the display point from said location for deriving a final interpolated data value for said display point.

16. Apparatus as set forth in claim 14 for deriving an interpolated data value at each display point within the slice, comprising means for providing a second signal representing the distance between the radial lines defining a slice as measured along a given row of display points, means for providing a third signal representing the change in the distance between the radial lines defining a slice that results from a step in the display point scan from one row of display points to the next, means responsive to said display point scanning signals for updating the second signal by the addition of a positive value of said third signal for each step along a column in a direction away from the origin of the sector or by a negative value of said third signal for each step along a column toward the origin of the sector, means for providing a fourth signal representing the distance between a given display point and one of the radial lines defining a slice as measured along a row of display points, means responsive to said display point scanning signals for updating said fourth signal by the addition of: $+K_x$ for each step along a row in a direction that if made from a display point in a slice would be away from said one of the radial lines defining the slice and toward the other; $-K_x$ for each step along a row in the opposite direction; $+K_y \tan \theta'$ for each step along a column in a direction that if made from a display point in the slice would be away from said one radial line and toward the other; and $-K_y \tan \theta'$ for each step along a column in a direction opposite to said latter direction, $\theta'$ being the acute angle between said one radial line and a column, means responsive to said display point scanning signals and said updated first signal for making available a first pair of data samples on one radial line defining the slice and a second pair of data samples on the other radial line defining the slice, one data sample of each pair having a radius less than that of the display point and the other data sample of each pair having a radius greater than that of the display point, means responsive to said updated first signal and said first pair of data samples for deriving a first intermediate interpolated data value at the radial distance along said one radial line of the display point, means responsive to said updated first signal and said second pair of data samples for deriving a second intermediate interpolated data value at the radial distance along said other radial line of the display point, and means responsive to said first and second intermediate interpolated data values and to the signals representing said updated second and updated fourth signals for deriving a final interpolated data value for said display point.

17. Apparatus as set forth in claim 14 having means responsive to said display point scanning signals for making selected data samples along at least one radial line defining a slice available for each display point, and means responsive to said available data samples and said updated first signal for deriving a data value at the said radial distance.

18. Apparatus as set forth in claim 17 wherein the selected data samples made available include the closest data samples on either side of the display points at which a data value is derived and the data value is an interpolation of the data samples.

19. Apparatus as set forth in any of claims 14, 15, 16, 17 or 18 wherein said given radial line is one of the radial lines defining said slice.

20. Apparatus as set forth in any of claims 14, 15, 16, 17, or 18 wherein said given display point is at the origin of the sector, whereby said first, second and fourth signals each have an initial value of zero.

21. In a display system wherein the image represented by data samples occurring along radial lines emanating from the origin of a sector is reproduced by a field of display points arranged in orthogonal rows and columns, the rows being separated by a distance $K_y$ and the columns being separated by a distance $K_x$, and the sector lying on one side of a row passing through its origin, apparatus for deriving signal indications of the respective angular positions of display points lying in a slice with respect to a pair of radial lines of the sector defining a slice, comprising means for providing a first signal representing the distance between the radial lines defining a slice as measured along a given row of display points, means for providing display point scanning signals indicating the steps from one display point to the next along a row or column of display points in scanning from a display point in said given row along a path including display points in the slice, means for providing a second signal representing the change in distance between the radial lines defining the slice as measured along a row of display points that results from a step in the display point scan from one row of display points to the next, said signal being equal to the product of $K_y |\tan \theta_2 - \tan \theta_1|$ wherein $\theta_1$ and $\theta_2$ are the respective acute angles between the radial lines defining a slice and a column of display points, means responsive to said display point scanning signals for updating said first signal by addition to it of: a positive value of said second signal for each step along a column in a direction away from the sector origin and a negative value of said second signal for each step toward said origin, means providing a third signal representing the distance between a given display point and one of the radial lines defining the slice as measured along a row of display points, means responsive to said display point scanning signals for updating said third signal by the addition to it of: $+K_x$ for each step along a row in a direction that if made from a display point in a slice would be away from said one of the radial lines defining the slice and toward the other; $-K_x$ for each step along a row in the opposite direction; $+K_y \tan \theta'$ for each step along a column that if made from a display point in the slice would be away from the said one radial line and toward the other; and $-K_y \tan \theta'$ for each step along a column in a direction opposite to said latter direction, $\theta$ being the acute angle between said one radial line and a column, whereby said updated third signals and said updated first signals respectively represent the angular position of said display point with respect to the radial lines defining the slice.

22. Apparatus as set forth in claim 21 having means for making available a data value located on each of the radial lines defining a slice, and means responsive to said data values and said updated first and updated third signals for deriving an interpolated data value at a display point.

23. Apparatus as set forth in claim 22 wherein the data values on said radial lines and the display point lie on a substantially straight line.

24. In a display system wherein the image represented by data samples occurring along radial lines emanating from the origin of the sector is reproduced by a field of display points arranged in orthogonal rows and columns, the rows being separated by a distance $K_y$ and the columns being separated by a distance $K_x$, apparatus for deriving interpolated data values for display points in a slice defined by a pair of radial lines of the sector having an origin at a given location in said field of display points, said apparatus comprising means for providing a first signal representing the radial distance of a given display point from said location, means for providing display point scanning signals indicating the steps from one display point to the next along a row or column of display points in scanning from said given display point along a path including display points in the slice for which interpolated data values are sought, means responsive to said display point scanning signals for updating said first signal by the addition of functions of: $+K_x \sin \theta$ for each step along a row in a direction away from a radial line passing through said location and parallel to said columns; $-K_x \sin \theta$ for each step along a row in the opposite direction; $+K_y \cos \theta$ for each step along a column in a direction away from said location; and $-K_y \cos \theta$ for each step along a column toward said location, the angle $\theta$ being the acute angle between a reference radial line passing through said location and parallel to said columns and a radial line passing through said location and near the angular center of said slice, said updated first signal representing the radial distance of each display point from said location when the display point scan reaches it, means for providing a second signal representing the distance between said pair of radial lines as measured along a given row of display points, means for providing a third signal representing the change in distance between said pair of radial lines as measured along a row of display points that results from a step from one row to an adjacent row, the said third signal being equal to the product of $K_y$ and the absolute value of the difference between the tangents of the respective acute angles between the radial lines of said pair and a radial line passing through said location and parallel to said columns, means responsive to said display point scanning signals for updating said second signal by the addition of: a signal representing the positive value of said third signal for each step along a column in a direction away from said location and a signal representing the negative value of said third signal for each step along a column toward said location, means for providing a fourth signal representing the distance between a given display point in said path and one of the radial lines of said pair as measured along a row of display points, means responsive to said display point scanning signals for updating said fourth signal by the addition of: $+K_x$ for each step along a row in a direction that if made from a display point in said slice would be away from one of the pair of radial lines and toward the other; $-K_x$ for each step along a row in the opposite direction; $+K_y \tan \theta'$ for each step along a column in a direction that if made from a display point in the slice would be away from the said one radial line of the pair and toward the other; and $-K_y \tan \theta'$ for each step along a column in a direction opposite to said latter direction, $\theta'$ being the acute angle between said one radial line and a radial line passing through said location and parallel to said columns, means responsive to said display point scanning signals and to said updated first signal for making available four data samples defining an area containing a display point for which an interpolated data value is sought, and means responsive to said updated first, updated second, updated fourth signals and said four data samples for deriving a final interpolated data value for each display point.

* * * * *